(12) United States Patent
Kozawa et al.

(10) Patent No.: US 11,466,140 B2
(45) Date of Patent: Oct. 11, 2022

(54) THERMOPLASTIC RESIN COMPOSITION, METHOD OF PRODUCING THERMOPLASTIC RESIN COMPOSITION, MOLDED ARTICLE OF CELLULOSE-REINFORCED RESIN, AND METHOD OF PRODUCING MOLDED ARTICLE OF CELLULOSE-REINFORCED RESIN

(71) Applicant: FURUKAWA ELECTRIC CO., LTD., Tokyo (JP)

(72) Inventors: Eiji Kozawa, Tokyo (JP); Takeshi Yagi, Tokyo (JP); Yasuo Nakajima, Tokyo (JP); Jae Kyung Kim, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 724 days.

(21) Appl. No.: 16/143,846

(22) Filed: Sep. 27, 2018

(65) Prior Publication Data
US 2019/0023877 A1    Jan. 24, 2019

Related U.S. Application Data

(63) Continuation of application No. PCT/JP2017/013023, filed on Mar. 29, 2017.

(30) Foreign Application Priority Data

Mar. 31, 2016   (JP) .............................. JP2016-073612

(51) Int. Cl.
| | | |
|---|---|---|
| *C08L 1/02* | (2006.01) | |
| *C08J 3/00* | (2006.01) | |
| *C08J 5/00* | (2006.01) | |
| *C08K 5/3445* | (2006.01) | |
| *C08L 23/06* | (2006.01) | |
| *C08L 23/16* | (2006.01) | |
| *C08L 101/12* | (2006.01) | |
| *B29C 48/00* | (2019.01) | |
| *B29K 23/00* | (2006.01) | |
| *B29K 201/00* | (2006.01) | |

(52) U.S. Cl.
CPC .................. *C08L 1/02* (2013.01); *C08J 3/005* (2013.01); *C08J 5/00* (2013.01); *C08K 5/3445* (2013.01); *C08L 23/06* (2013.01); *C08L 23/16* (2013.01); *C08L 101/12* (2013.01); *B29C 48/022* (2019.02); *B29K 2023/065* (2013.01); *B29K 2201/00* (2013.01); *C08J 2301/02* (2013.01); *C08J 2323/06* (2013.01); *C08J 2323/26* (2013.01); *C08J 2401/02* (2013.01); *C08J 2423/06* (2013.01); *C08J 2423/26* (2013.01)

(58) Field of Classification Search
CPC .. C08L 1/02; C08L 23/06; C08L 23/16; C08L 101/12; C08J 3/005; C08J 5/00; C08J 2301/02; C08J 2323/06; C08J 2323/26; C08J 2401/02; C08J 2423/06; C08J 2423/26; C08K 5/3445; B29C 48/022; B29K 2023/065; B29K 2201/00
USPC .......................................................... 524/35
See application file for complete search history.

(56) References Cited

U.S. PATENT DOCUMENTS

| | | |
|---|---|---|
| 3,645,939 A | 2/1972 | Gaylord |
| 3,856,724 A | 12/1974 | O'Connor et al. |
| 4,380,522 A | 4/1983 | Georlette et al. |
| 2004/0214925 A1 | 10/2004 | Sigworth |
| 2005/0288484 A1 | 12/2005 | Holbrey et al. |
| 2006/0054058 A1 | 3/2006 | Balliello |
| 2008/0146701 A1 | 6/2008 | Sain et al. |
| 2008/0188636 A1 | 8/2008 | Argyropoulos |
| 2011/0086948 A1 | 4/2011 | Hong et al. |
| 2012/0225976 A1 | 9/2012 | Bampi |
| 2013/0001477 A1 | 1/2013 | Kimura et al. |
| 2013/0209523 A1 | 8/2013 | Ichikawa et al. |
| 2014/0073776 A1 | 3/2014 | Shiramizu et al. |
| 2014/0336309 A1 | 11/2014 | Sakata et al. |
| 2015/0105499 A1 | 4/2015 | Yano et al. |
| 2016/0075877 A1 | 3/2016 | Kaiser |
| 2017/0002182 A1 | 1/2017 | Imai et al. |
| 2019/0023877 A1 | 1/2019 | Kozawa et al. |
| 2019/0023882 A1 | 1/2019 | Kim et al. |
| 2019/0031858 A1 | 1/2019 | Kozawa et al. |

(Continued)

FOREIGN PATENT DOCUMENTS

| | | |
|---|---|---|
| CN | 87108108 A | 8/1988 |
| CN | 102093734 A | 6/2011 |
| CN | 103360619 A | 10/2013 |

(Continued)

OTHER PUBLICATIONS

JP2016017096A—machine translation (Year: 2016).*

(Continued)

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

A method of producing a thermoplastic resin composition containing a thermoplastic synthetic resin and a cellulose, in which at least one type of the thermoplastic synthetic resin is a resin having a group containing a partial structure of an acid anhydride in the polymer molecule;

a molded article of a cellulose-reinforced resin; and a method of producing a molded article of a cellulose-reinforced resin.

13 Claims, No Drawings

(56) References Cited

U.S. PATENT DOCUMENTS

2021/0024722 A1 1/2021 Fujihashi et al.

FOREIGN PATENT DOCUMENTS

| | | | |
|---|---|---|---|
| CN | 104292412 | A | 1/2015 |
| CN | 104761554 | A | 7/2015 |
| CN | 108779310 | A | 11/2018 |
| CN | 108834420 | A | 11/2018 |
| CN | 108884328 | A | 11/2018 |
| EP | 0 822 223 | A1 | 2/1998 |
| EP | 0897943 | A2 | 2/1999 |
| EP | 2 492 305 | A1 | 8/2012 |
| JP | 48-10612 | B1 | 4/1973 |
| JP | 55-131031 | A | 10/1980 |
| JP | 62-39642 | A | 2/1987 |
| JP | 63-33448 | A | 2/1988 |
| JP | 9-316248 | A | 12/1997 |
| JP | 10-1575 | A | 1/1998 |
| JP | 2001-181513 | A | 7/2001 |
| JP | 3479661 | B2 | 12/2003 |
| JP | 2005-187524 | A | 7/2005 |
| JP | 2005187524 | A * | 7/2005 |
| JP | 2009-167250 | A | 7/2009 |
| JP | 2012-207063 | A | 10/2012 |
| JP | 2012207063 | A * | 10/2012 |
| JP | 2012-214563 | A | 11/2012 |
| JP | 2013-107987 | A | 6/2013 |
| JP | 2013-248824 | A | 12/2013 |
| JP | 2014-1361 | A | 1/2014 |
| JP | 2014-193959 | A | 10/2014 |
| JP | 2015-203093 | A | 11/2015 |
| JP | 2016-17096 | A | 2/2016 |
| JP | 2016017096 | A * | 2/2016 |
| JP | 2017-128717 | A | 7/2017 |
| JP | 2017-171698 | A | 9/2017 |
| KR | 10-1023928 | B1 | 3/2011 |
| WO | WO 03/029329 | A2 | 4/2003 |
| WO | WO 2011/118407 | A1 | 9/2011 |
| WO | WO 2013/133093 | A1 | 9/2013 |
| WO | WO 2015/039237 | A1 | 3/2015 |
| WO | WO 2015/053226 | A1 | 4/2015 |
| WO | WO 2015/111619 | A1 | 7/2015 |
| WO | WO 2015/152189 | A1 | 10/2015 |
| WO | WO 2017/141779 | A1 | 8/2017 |
| WO | WO 2017/170745 | A1 | 10/2017 |
| WO | WO 2017/170746 | A1 | 10/2017 |
| WO | WO 2017/170747 | A1 | 10/2017 |

OTHER PUBLICATIONS

JP2005187524A—machine translation (Year: 2005).*
JP 2012-207063A—machine translation (Year: 2012).*
Partial Supplemental European Search Report for European Application 17775280.5, dated Aug. 26, 2019.
Chinese Office Action and Search Report for Chinese Application No. 201780017867.X, dated Sep. 3, 2020, with English translation of the Office Action.
International Search Report (PCT/ISA/210) issued in PCT/JP2017/013023, dated Jul. 4, 2017.
Written Opinion (PCT/ISA/237) issued in PCT/JP2017/013023, dated Jul. 4, 2017.
Chinese Office Action for Chinese Application No. 201780017841.5, dated Dec. 10, 2020, with English translation.
English translation of the International Search Report and Written Opinion of the International Searching Authority (forms PCT/ISA/210 and PCT/ISA/237), dated Jul. 4, 2017, for International Application No. PCT/JP2017/013024.
International Search Report and Written Opinion of the International Searching Authority (forms PCT/ISA/210 and PCT/ISA/237), dated Jun. 27, 2017, for International Application No. PCT/JP2017/013022, with an English translation of the International Search Report.
Chinese Office Action and Search Report for Chinese Application No. 201780017841.5, dated Jul. 3, 2020, with English translation of the Office Action.
Chinese Office Action and Search Report for Chinese Application No. 201780018439.9, dated Aug. 26, 2020, with English translation of the Office Action.
Extended European Search Report for European Application No. 20170209.9, dated Sep. 15, 2020.
Chinese Office Action and Search Report for Chinese Application No. 201780017867.X, dated Apr. 6, 2021, with English translation.
Japanese Office Action, dated Feb. 9, 2021, for Japanese Application No. 2018-509368, with an English machine translation.
Japanese Office Action, dated Feb. 9, 2021, for Japanese Application No. 2018-509369, with an English machine translation.
Japanese Office Action, dated Feb. 9, 2021, for Japanese Application No. 2018-509370, with an English machine translation.
Extended European Search Report for European Application No. 17775279.7, dated Oct. 8, 2019.
Office Action dated Mar. 25, 2021 in Chinese Patent Application No. 201780017841.5, with English translation.
U.S. Office Action, dated Jun. 18, 2021, for U.S. Appl. No. 16/144,430.
U.S. Office Action, dated Jun. 24, 2021, for U.S. Appl. No. 16/144,304.
Office Action dated Dec. 16, 2021 in copending U.S. Appl. No. 16/144,430.
Chinese Office Action, dated Sep. 3, 2021, for Chinese Application No. 201780017867.X, with an English translation.
Chinese Office Action for Chinese Application No. 201780018439.9, dated Jun. 3, 2021, with English translation.
Chinese Office Action for corresponding Chinese Application No. 201880063819.9, dated Jun. 29, 2021.
Chinese Office Action for corresponding Chinese Application No. 201880063823.5, dated Jul. 5, 2021.
Chinese Office Action for corresponding Chinese Application No. 201880063825.4, dated Jul. 5, 2021.
Extended European Search Report for corresponding European Aoplication No. 18860137.1, dated Jun. 4, 2021.
Extended European Search Report for corresponding European Application No. 18860626.3, dated Jun. 4, 2021.
Extended European Search Report for corresponding European Application No. 18863337.4, dated May 11, 2021.
International Preliminary Report on Patentability and English translation of the Written Opinion of the International Searching Authority for International Application No. PCT/JP2018/036582, dated Mar. 31, 2020.
International Preliminary Report on Patentabllity and English transiation of the Written Opinion of the International Searching Authority for International Application No. PCT/JP2018/036583, dated Mar. 31, 2020.
International Preliminarv Report on Patentability and English translation of the Written Opinion of the International Searching Authority for International Application No. PCT/JP2018/036584, dated Mar. 31, 2020.
Suzuki et al., "Development of continous process enabling nanofibrillation of pulp and melt compounding," Cellulose, vol. 20, 2013, pp. 201-210.
U.S. Office Action for copending U.S. Appl. No. 16/144,304, dated Jan. 7, 2022.
U.S. Office Action for copending U.S. Appl. No. 16/832,986, dated Apr. 22, 2021.
U.S. Office Action for copending U.S. Appl. No. 16/832,986, dated Sep. 7, 2021.
U.S. Office Action for copending U.S. Appl. No. 16/833,071, dated Apr. 23, 2021.
U.S. Office Action for copending U.S. Appl. No. 16/833,071, dated Aug. 23, 2021.
U.S. Office Action for copending U.S. Appl. No. 16/833,071, dated Nov. 2, 2021.
U.S. Office Action for copending U.S. Appl. No. 16/833,222, dated Apr. 30, 2021.
U.S. Office Action for copending U.S. Appl. No. 16/833,222, dated Sep. 20, 2021.

(56) References Cited

OTHER PUBLICATIONS

U.S. Appl. No. 16/832,986, filed Mar. 27, 2020.
U.S. Appl. No. 16/833,222, filed Mar. 27, 2020.
U.S. Appl. No. 16/833,071, filed Mar. 27, 2020.
Office Action dated Feb. 9, 2022 for Chinese Patent Application No. 201780018439.9, with machine English translation.
Britannica, The Editors of Encyclopaedia, "Kraft process," Encyclopedia Britannica, Sep. 7, 2015, retreived from https://www.britannica.com/technology/kraft-process, accessed Apr. 23, 2022, p. 1.
Chinese Office Action and Search Report for Chinese Application No. 201880063819.9, dated Jan. 24, 2022, with English translation.
Chinese Office Action and Search Report for Chinese Application No. 201880063623.5, dated Jan. 29, 2022, with English translation.
Chinese Office Action for Chinese Application No. 201880063825.4, dated Jan. 30, 2022, with English translation.
Duan et al., "Natural Polymeric Materials," Huazhong University of Science and Technology Press, Wuhan, Jun. 2011, (6 pages total), with an English translation.
U.S. Office Action for U.S. Appl. No. 16/833,222, dated Mar. 15, 2022.
U.S. Office Action for U.S. Appl. No. 16/144,304, dated Apr. 28, 2022.
U.S. Office Action for U.S. Appl. No. 16/144,430, dated Apr. 28, 2022.
U.S. Office Action for U.S. Appl. No. 16/832,986, dated Mar. 15, 2022.
Wang, "Principles and Applications of Polymer Blend Modification," China Light Industry Press, 2017, pp. 192-193 (6 pages total), with English translation.
Chinese Office Action for Chinese Application No. 201780017867.X, dated Dec. 22, 2021, with English translation.
Chinese Office Action for Chinese Application No. 201780018439.9, dated May 30, 2022, including an English translation.
Japanese Office Action for Japanese Application No. 2019-545198, dated May 30, 2022, including an English translation.

* cited by examiner

THERMOPLASTIC RESIN COMPOSITION, METHOD OF PRODUCING THERMOPLASTIC RESIN COMPOSITION, MOLDED ARTICLE OF CELLULOSE-REINFORCED RESIN, AND METHOD OF PRODUCING MOLDED ARTICLE OF CELLULOSE-REINFORCED RESIN

CROSS-REFERENCE TO RELATED APPLICATIONS

This application is a Continuation of PCT International Application No. PCT/JP2017/013023 filed on Mar. 29, 2017, which claims priority under 35 U.S.C. § 119 (a) to Japanese Patent Application No. 2016-073612 filed in Japan on Mar. 31, 2016. Each of the above applications is hereby expressly incorporated by reference, in its entirety, into the present application.

FIELD OF THE INVENTION

The present invention relates to a thermoplastic resin composition, a method of producing a thermoplastic resin composition, a molded article of a cellulose-reinforced resin, and a method of producing a molded article of a cellulose-reinforced resin.

More specifically, the present invention relates to a thermoplastic resin composition useful for a molded article of a cellulose-reinforced resin, containing cellulose, particularly plant fiber-derived cellulose, and an ionic compound; a method of producing a thermoplastic resin composition, a molded article of a cellulose-reinforced resin, and a method of producing a molded article of a cellulose-reinforced resin.

BACKGROUND OF THE INVENTION

It is known that when cellulose is miniaturized to a very small size, its mechanical properties are increased, and advancement of the miniaturization to nanosize results in a material achieving extremely high elastic modulus and high strength. A study on the use of this material as a resin-reinforcing material has been conducted and its capability has attracted attention.

As a method of producing a composite resin composed of the foregoing cellulosic tiny fiber and a thermoplastic resin, a method of at first, fibrillating (micro-fibrillation) a plant fiber and mixing and kneading the micro-fibrillated plant fiber (cellulosic tiny fiber) with a thermoplastic resin such as polypropylene using a compatibilizing agent and an interface reinforcing agent in order to conduct an interface control of the dispersibility and an interface control between the fiber and the resin, is known (for example, see Patent Literature 1).

However, the forgoing method includes at least a step of fibrillating (micro-fibrillation) a plant fiber and a step of mixing the micro-fibrillated plant fiber (cellulosic tiny fiber) with a thermoplastic resin thereby to form a composite. Therefore, it is the reality of the situation that the process becomes cumbersome, which results in the increase of production cost. In addition to these problems, when kneaded with the thermoplastic resin, re-aggregation is easily occurred and its control is difficult.

Recently, a method of modifying a surface of the plant fiber by a chemical treatment and then kneading the modified plant fiber with a thermoplastic resin using a processing machine is proposed (for example, see Patent Literature 1).

This method is a method of prompting miniaturization of the plant fiber, while kneading the modified plant fiber together with a thermoplastic resin in a processing machine.

However, in this method, after once swelling a plant fiber, then acting a chemical substance thereon, and then drying in the process of a chemical treatment, the plant fiber is poured into the processing machine. Therefore, this method was after all cumbersome in the process and had limitations in cost reduction, although this method is improved as compared to the above-described method.

CITATION LIST

Patent Literatures

Patent Literature 1: US 2008/0146701
Patent Literature 2: WO 2013/133093

SUMMARY OF THE INVENTION

Technical Problem

In view of the problems in the conventional method of producing a cellulose-reinforced thermoplastic resin, the present invention is contemplated to provide: a thermoplastic resin composition in which miniaturization of a plant fiber (kraft pulp) has been achieved by a simplified method in the production process for making a composite of the thermoplastic resin and the plant fiber; a method of producing the thermoplastic resin composition; a molded article of the cellulose-reinforced resin; and a method of producing the molded article of the cellulose-reinforced resin.

Solution to Problem

As a result of intensive studies to solve the above-described problems, the present inventors found that in a step of kneading a plant fiber and a thermoplastic resin, the plant fiber is miniaturized by incorporating therein a resin having a group containing a partial structure of an acid anhydride in the polymer molecular chain as one type of the thermoplastic resins, and miniaturization is further facilitated by making an ionic substance coexist with a mixture of the plant fiber and the thermoplastic resin, whereby the plant fiber is miniaturized and a cellulose-reinforced thermoplastic resin which is a composite resin composed of the miniaturized plant fiber and the thermoplastic resin is obtained.

As a result of further studies based on the above-described findings, it was found that the above-described problems are accomplished by the following constituents.

(1) A thermoplastic resin composition, containing:
  a thermoplastic synthetic resin, and
  a cellulose,
wherein at least one type of the thermoplastic synthetic resin is a resin having a group containing a partial structure of an acid anhydride in the polymer molecule.

(2) The thermoplastic resin composition described in the above item (1), containing an ionic compound;
wherein a content of the ionic compound is 0.001 times or more and less than 1.000 time of the mass content of the cellulose.

(3) The thermoplastic resin composition described in the above item (2), wherein the ionic compound is represented by Formula (1) or (2):

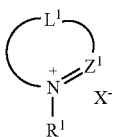

Formula (1)

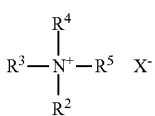

Formula (2)

wherein, in Formulas (1) and (2), $Z^1$ designates =C(Ra)- or =N—; Ra designates a hydrogen atom or a substituent; $L^1$ designates a divalent linking group; $R^1$ to $R^5$ each independently designate an alkyl group, an alkenyl group, a cycloalkyl group, an aryl group or a heterocyclic group; at least two of $R^2$ to $R^5$ may be bonded to each other to form a ring; and $X^-$ designates an anion.

(4) The thermoplastic resin composition described in the above item (3), wherein the compound represented by Formula (1) or (2) is represented by any one of Formulas (1a), (1b) and (2a) to (2c):

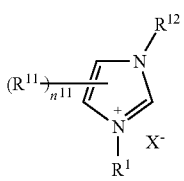

Formula (1a)

Formula (1b)

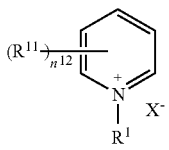

Formula (2a)

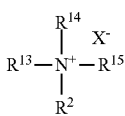

Formula (2b)

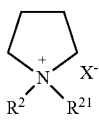

Formula (2c)

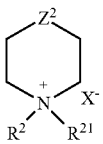

wherein, in Formulas (1a), (1 b) and (2a) to (2c), $R^1$, $R^2$ and $X^-$ have the same meanings as R', $R^2$ and $X^-$ in Formula (1) or (2), respectively; $R^{11}$ and $R^{12}$ each independently designate a substituent; $n^{11}$ is an integer of 0 to 3; $n^{12}$ is an integer of 0 to 5; when there exists two or more $R^{11}$'s, the $R^{11}$'s may be the same or different from each other; at least two of $R^{11}$'s may be bonded to each other to form a ring; $R^{13}$ to $R^{15}$ each independently designate an alkyl group, an alkenyl group, a cycloalkyl group, an aryl group, or a heterocyclic group; at least two of $R^2$ and $R^{13}$ to $R^{15}$ do not bonded to each other to form any ring; $R^{21}$ has the same meaning as $R^2$; $Z^2$ designates a single bond, a methylene group, —C(=O)—, —O—, —S—, —S(=O)—, —SO$_2$—, —N(Rα1)-, or —N$^+$(Rα1)(Rα2)-; Rα1 designates a hydrogen atom or a substituent; Rα2 designates a substituent; and Rα1 and Rα2 may be bonded to each other to form a ring.

(5) The thermoplastic resin composition described in the above item (3) or (4), wherein the $X^-$ is a halogen ion, a carboxylic acid anion, a sulfonic acid anion, a phosphate anion, a phosphonic acid anion, a dicyanamide ion, or a bis(trifluoromethanesulfonyl)imide ion.

(6) The thermoplastic resin composition described in any one of the above items (1) to (5), wherein the cellulose is plant fiber-derived cellulose.

(7) The thermoplastic resin composition described in any one of the above items (1) to (6), wherein a content of the cellulose is from 1 to 100 parts by mass, with respect to 100 parts by mass of the thermoplastic synthetic resin.

(8) The thermoplastic resin composition described in any one of the above items (1) to (7), wherein a content of the resin having a group containing an acid anhydride in the polymer molecule is from 1 to 50% by mass in the thermoplastic synthetic resin.

(9) The thermoplastic resin composition described in any one of the above items (1) to (8), wherein an apparent elastic modulus (Ef$_1$) of the cellulose contained in the thermoplastic resin composition at the time when a uniform dispersion element is formed by applying a shear force to the thermoplastic resin composition, is 1.1 times or more with respect to an apparent elastic modulus (Ef$_0$) of the cellulose contained in a thermoplastic resin composition at the time when a uniform dispersion element is formed by applying a shear force to the thermoplastic resin composition that does not contain the ionic compound or the resin having a group containing an acid anhydride in the polymer molecule.

(10) A method of producing the thermoplastic resin composition described in any one of the above items (1) to (9), which contains a step of blending a thermoplastic synthetic resin, and a cellulose or a mixture of a cellulose and an ionic compound,
wherein, when the mixture of a cellulose and an ionic compound is bended, a content of the ionic compound in the mixture is 0.1% by mass or more and less than 50% by mass.

(11) The method of producing the thermoplastic resin composition described in the above item (10), which contains a step of subjecting the thermoplastic resin composition to a kneading processing.

(12) The method of producing the thermoplastic resin composition described in the above item (10) or (11), which contains a step of, after kneading the resin having a group containing a partial structure of an acid anhydride in the polymer molecule, and the cellulose or the mixture of a cellulose and an ionic compound, blending the resultant kneaded composition with a thermoplastic resin other than the resin having a group containing a partial structure of an acid anhydride in the polymer molecule.

(13) A method of producing a molded article of a cellulose-reinforced resin, which contains employing the thermoplastic resin composition produced by the method of producing the thermoplastic resin composition described in any one of the above items (10) to (12), thereby molding the thermoplastic resin composition.

(14) A molded article of a cellulose-reinforced resin, containing:
a thermoplastic synthetic resin, and
a cellulose constituent,
wherein at least one type of the thermoplastic synthetic resin is a resin having at least one group selected from a group containing a partial structure of an acid anhydride and a group containing an acylated cellulose structure, in the polymer molecule.
(15) The molded article of a cellulose-reinforced resin described in the above item (14), containing an ionic compound;
wherein a content of the ionic compound is 0.001 times or more and less than 1.000 time of the mass component content of the cellulose.
(16) A molded article of a cellulose-reinforced resin, which is obtained by molding the thermoplastic resin composition described in any one of the above items (1) to (9).

Effects of Invention

The thermoplastic resin composition and the method of producing the thermoplastic resin composition according to the present invention allowed miniaturization of the plant fiber (kraft pulp) by a simplified method in the production process for making a composite of the thermoplastic resin and the plant fiber and further allowed provision of a molded article of a cellulose-reinforced resin containing the resultantly miniaturized cellulose; and also provision of a method of producing the molded article of the cellulose-reinforced resin.

In other words, simply by kneading the plant fiber-derived cellulose (pulp), with the thermoplastic resin, miniaturization of the pulp can be promoted in this process.

Therefore, a step of preliminarily miniaturizing the plant fiber-derived cellulose becomes unnecessary, and this holds promise of a great reduction in production cost. Further, because the elastic modulus is increased by the miniaturized cellulose, reinforcement efficiency to the thermoplastic resin can be enhanced.

In this way, the simple and convenient method of the present invention allows a production of the cellulose-reinforced resin due to a miniaturized cellulose fiber, or a production of the molded article thereof, and this holds promise of a great reduction in production cost. Further, a wide use of the cellulose-reinforced resin or the molded article thereof according to the present invention also holds promise of reduction in weight, improved strength, reduction in thickness and when it is discarded, reduction in burned ash, and the like.

DESCRIPTION OF EMBODIMENTS

The thermoplastic resin composition and the molded article of the cellulose-reinforced resin according to the present invention each contain a thermoplastic synthetic resin and a cellulose. Herein, a content of the ionic compound is 0.001 times or more and less than 1.000 time of the mass content of the cellulose. Further, at least one type of the thermoplastic synthetic resin contains a resin having a group containing a partial structure of an acid anhydride in the polymer molecule. The molded article of a cellulose-reinforced resin contains a resin having at least one group selected from a group containing a partial structure of an acid anhydride and a group containing an acylated cellulose structure, in the polymer molecule.

Further, the method of producing the thermoplastic resin composition according to the present invention includes a step of blending a thermoplastic synthetic resin and a mixture of cellulose and an ionic compound. A content of the ionic compound in the mixture is 0.1% by mass or more and less than 50% by mass.

Further, the method of producing the molded article of the cellulose-reinforced resin according to the present invention is performed by molding the above-described thermoplastic resin composition.

<<Thermoplastic Resin Composition>>

The thermoplastic resin composition of the present invention at least contains a thermoplastic synthetic resin and a cellulose.

First, the thermoplastic synthetic resin is described below.

<Thermoplastic Synthetic Resin>

In the present invention, the base resin is a thermoplastic synthetic resin at least one type of which is a resin having a group containing a partial structure of an acid anhydride in the polymer molecule.

Meanwhile, the base resin means a resin constituent having the largest content of the thermoplastic synthetic resin contained in the thermoplastic resin composition. Herein, the cellulose is not a synthetic resin and therefore does not fall within the thermoplastic synthetic resin.

The thermoplastic synthetic resin containing a resin having a group containing a partial structure of an acid anhydride in the polymer molecule, which is used in the present invention, is not particularly limited. Therefore, any type of synthetic resin may be acceptable, as long as it is commonly used as a thermoplastic synthetic resin.

This is for the reason explained below.

In the present invention, as described below, miniaturization of the cellulose is realized by kneading a cellulose in a thermoplastic synthetic resin.

Therefore, a viscosity of the thermoplastic synthetic resin when mixing with the cellulose becomes an important property.

Specifically, the stress (Fh) which a dispersing element of the cellulose (containing an ionic compound in a case of containing an ionic compound) present in the thermoplastic synthetic resin gets in the shear field, is simply expressed by Equation (1.1).

$$F_h = 6.12 \eta \dot{\gamma} R \tag{1.1}$$

Meanwhile, in Equation (1.1), hereinafter the dotted γ is referred to simply as γ.

The stress (Fh) which the above-described dispersing element gets in the shear field expresses a force that a spherical filler of radius R gets in the thermoplastic synthetic resin having a shear rate γ and a viscosity η.

In this regard, it is considered that the cellulose present in the thermoplastic synthetic resin is not spherical, but in the fibrous form. Therefore, this Equation cannot be used in unchanged form. However, because the spherical form and the fibrous form are the same in principle, the parameters (η, γ, R) having an effect on a stress (Fh) which the above-described dispersing element gets in the shear field are also the same in both parties.

Accordingly, in order to miniaturize the cellulose, it is important how much force is applied in the shear field of the thermoplastic synthetic resin. Therefore, it is considered that the greater advantage is given with the larger η or γ.

Herein, to increase the shear rate (γ) means to increase the shear rate to be mechanically applied to the thermoplastic synthetic resin.

Accordingly, if the shear rate (γ) is increased, a force which the cellulose gets in the thermoplastic synthetic resin becomes large. However, a frictional force due to kneading also becomes large, which results in temperature rise of the thermoplastic synthetic resin.

However, in general, the cellulose has properties of causing change in color at more than 200° C. and of initiating a thermal decomposition at around 300° C. or more. Therefore, a method of laying the cellulose in the shear field which drastically increases a temperature is not proper from the viewpoint of maintaining the properties as the material.

From the above, increase in viscosity (q) of the thermoplastic synthetic resin becomes important for miniaturization of the cellulose.

In general, the viscosity (η) of the thermoplastic synthetic resin satisfies the following relationship (Andrade's equation).

$$\eta = Ae^{Ev/RT} \quad (1.2)$$

Herein, A designates proportional constant, Ev designates fluid activation energy, R designates gas constant, and T designates temperature (K). The fluid activation energy corresponds to activation energy in the Arrhenius chemical reaction. This is understood by regarding the flow as a rate process.

Accordingly, an important parameter in order to control the viscosity (η) is a temperature.

The temperature can be manipulated and adjusted as a processing temperature, regardless of the kind of the thermoplastic synthetic resin.

Accordingly, the thermoplastic synthetic resin as a medium which grants power necessary to miniaturize the cellulose is a resin that can be widely used without any particular limitation of the kind thereof.

[Base Resin]

The base resin is a resin constituent having the largest content of the thermoplastic synthetic resin contained in the thermoplastic resin composition, and is contained at least in an amount on a mass basis, which is equal to or more than a resin having a group containing a partial structure of an acid anhydride in the polymer molecule. Meanwhile, in the present invention, the base resin is a thermoplastic synthetic resin other than the resin having a group containing a partial structure of an acid anhydride in the polymer molecule.

Examples of the thermoplastic synthetic resin as the base resin include a polyolefin resin, a polyester resin, a polycarbonate resin, a polyamide resin, a polyimide resin, a polyurethane resin, a polyphenylenesulfide resin, a polyphenylene oxide resin, a cellulose acylate resin, a phenol resin, a melamine resin, an epoxy resin, a phenoxy resin, and a silicon resin.

Among these, the polyolefin resin is preferable in the present invention.

<Polyolefin Resin>

The polyolefin resin used in the present invention is a polyolefin resin prepared by polymerizing at least one kind of olefin, and the polyolefin resin may be a homopolymer or a copolymer.

The specific examples of such olefin include α-olefin having 4 to 12 carbon atoms including ethylene, propylene, isobutylene, and isobutene (1-butene), butadiene, isoprene, (meth)acrylic acid ester, (meth)acrylic acid, (meth)acrylamide, vinyl alcohol, vinyl acetate, vinyl chloride, styrene, and acrylonitrile.

In addition, specific examples of the α-olefin having 4 to 12 carbon atoms include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene.

Specific examples of the polyolefin resin include a polyethylene resin, a polypropylene resin, a polyisobutylene resin, a polyisobutene resin, a polyisoprene resin, a polybutadiene resin, a (meth)acrylic resin (that is, an allyl resin), a vinyl resin such as a poly(vinyl chloride) resin, a poly(meth)acrylamide resin, a polystyrene resin, an acrylonitrile-butadiene-styrene copolymer resin (ABS resin), an ethylene-(meth)acrylate copolymer and an ethylene-vinyl acetate copolymer.

Among these resins, a polyethylene resin, a polypropylene resin, and an acrylonitrile-butadiene-styrene copolymer resin (ABS resin) are preferable, and a polyethylene resin and a polypropylene resin are more preferable.

Examples of the polyethylene resin include an ethylene homopolymer, an ethylene-α-olefin copolymer, and the like. As the α-olefin, 1-butene, 1-pentene, 1-hexene, and 1-octene are preferable.

Specific examples of the ethylene-α-olefin copolymer include an ethylene-1-butene copolymer, an ethylene-1-pentene copolymer, an ethylene-1-hexene copolymer, an ethylene-1-octene copolymer, and the like.

In addition, in a case where classification is made depending on density or shape, any of a high density polyethylene (HDPE), a low density polyethylene (LDPE), a very low density polyethylene (VLDPE), a linear low density polyethylene (LLDPE) and an ultra-high molecular weight polyethylene (UHMW-PE) may be used.

Specific examples of the polypropylene resin include a propylene homopolymer, a propylene-ethylene random copolymer, a propylene-α-olefin random copolymer, a propylene-ethylene-α-olefin copolymer and a propylene block copolymer (composed of a propylene homopolymer component or a copolymer component mainly composed of propylene, and a copolymer obtained by copolymerizing propylene with at least one kind of a monomer selected from ethylene and α-olefin). These polypropylene resins may be used singly or two or more kinds thereof may be used in combination.

As the α-olefin used in the polypropylene resin, 1-butene, 1-pentene, 1-hexene, 4-methyl-1-pentene, 1-octene, and 1-decene are preferable, and 1-butene, 1-hexene, and 1-octene are more preferable.

Specific examples of the propylene-α-olefin random copolymer include a propylene-1-butene random copolymer, a propylene-1-hexene random copolymer, and a propylene-1-octene random copolymer.

Specific examples of the propylene-ethylene-α-olefin copolymer include a propylene-ethylene-1-butene copolymer, a propylene-ethylene-1-hexene copolymer, and a propylene-ethylene-1-octene copolymer.

Specific examples of the propylene block copolymer include a (propylene)-(propylene-ethylene) copolymer, a (propylene)-(propylene-ethylene-1-butene) copolymer, a (propylene)-(propylene-ethylene-1-hexene) copolymer, a (propylene)-(propylene-1-butene) copolymer, a (propylene)-(propylene-1-hexene) copolymer, a (propylene-ethylene)-(propylene-ethylene) copolymer, a (propylene-ethylene)-(propylene-ethylene-1-butene) copolymer, a (propylene-ethylene)-(propylene-ethylene-1-hexene) copolymer, a (propylene-ethylene)-(propylene-1-butene) copolymer, a (propylene-ethylene)-(propylene-1-hexene) copolymer, a (propylene-1-butene)-(propylene-ethylene) copolymer, a (propylene-1-butene)-(propylene-ethylene-1-butene) copolymer, a (propylene-1-butene)-(propylene-ethylene-1-hexene) copolymer, a (propylene-1-butene)-(propylene-1-butene) copolymer and a (propylene-1-butene)-(propylene-1-hexene) copolymer.

Among these polypropylene resins, a propylene homopolymer, a propylene-ethylene random copolymer, a propylene-1-butene random copolymer, a propylene-ethylene-1-butene copolymer, and a propylene block copolymer component are preferable.

Crystallinity of the polypropylene resin is determined by a melting temperature (melting point) or stereoregularity, and adjusted according to quality required for the polyolefin resin composition of the present invention, and quality required for a molded article obtained by molding the composition.

In addition, the stereoregularity refers to an isotactic index or a syndiotactic index.

The isotactic index can be determined by a $^{13}$C-NMR method described in Macromolecules, Vol. 8, p. 687 (1975). Specifically, the isotactic index of the polypropylene resin is determined as an area fraction of an mmmm peak in a total absorption peak in a carbon region of a methyl group in a $^{13}$C-NMR spectrum.

A material having a high isotactic index has high crystallinity, and the isotactic index is preferably 0.96 or more, more preferably 0.97 or more, and further preferably 0.98 or more.

On the other hand, the syndiotactic index can be determined by a method described in J. Am. Chem. Soc., 110, 6255 (1988) or Angew. Chem. Int. Ed. Engl., 1955, 34, 1143-1170. A material having a high syndiotactic index has high crystallinity.

Specific examples of the vinyl resin include a vinyl chloride resin [a homopolymer of a vinyl chloride monomer (poly(vinyl chloride) resin and the like), a copolymer of a vinyl chloride monomer with other monomer (a vinyl chloride-vinyl acetate copolymer, a vinyl chloride-(meth)acrylic acid ester copolymer) and the like], a vinyl alcohol resin (a homopolymer such as poly(vinyl alcohol), a copolymer such as an ethylene-vinyl alcohol copolymer and the like), and a poly(vinyl acetal) resin such as poly(vinyl formal). These vinyl resins can be used singly or two or more kinds thereof can be used in combination.

Melt flow rate of the polyolefin resin is usually 0.01 to 400 g/10 minutes, and from the standpoint of enhancing mechanical strength and production stability, 0.1 to 400 g/10 minutes is preferable, and 0.5 to 200 g/10 minutes is more preferable.

Meanwhile, MFR is a mass of the polymer which outflows per 10 minutes (g/10 min) at 190° C. under a load of 2.16 kg in conformity with JIS K7210, unless otherwise indicated.

[Resin Having Group Containing Partial Structure of Acid Anhydride in Polymer Molecule]

The group containing a partial structure of an acid anhydride in the polymer molecule, more specifically in the polymer chain, means a group in which at least one hydrogen atom of the acid anhydride has been substituted with a bond (—). Whether the acid anhydride is a linear acid anhydride or a cyclic acid anhydride does not matter. Further, a mixed acid anhydride is also acceptable.

In the present invention, the above-described group has been incorporated in the polymer molecular chain by a chemical bond.

In a case where the group containing a partial structure of an acid anhydride is a group in which one of hydrogen atoms of the acid anhydride has been substituted with a bond (—), a group represented by Formula (Aanh-1) is preferable.

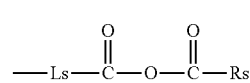

Formula (Aanh-1)

In Formula (Aanh-1), Ls designates a single bond or a linking group; Rs designates a hydrogen atom, an alkyl group, an alkenyl group, an alkynyl group, a cycloalkyl group, a cycloalkenyl group, an aryl group, or a heterocyclic group; and Rs and Ls may be bonded to each other to form a ring.

The linking group of Ls is preferably an alkylene group, an alkenylene group, an alkynylene group, a cycloalkylene group, a cycloalkenylene group, an arylene group, a divalent heterocyclic group, —C(=O)—, —O—, —S—, —SO$_2$—, —SO—, —N(Rsa)-, or a group formed by the combination of these groups. Herein, Rsa designates a hydrogen atom or a substituent.

The number of carbon atoms of the alkylene group is preferably 1 to 12, more preferably 1 to 8, and further preferably 1 to 4. Examples thereof include methylene, ethylene, isopropylene, trimethylene, tetramethylene, and hexamethylene. The alkylene group may have a substituent, and examples of such a substituent include the substituents for Ra described below.

The number of carbon atoms of the alkenylene group is preferably 2 to 12, more preferably 2 to 8, and further preferably 2 to 4. Examples thereof include vinylene, propynylene, and 4-propyl-2-pentenylene. The alkenylene group may have a substituent, and examples of such a substituent include the substituents for Ra described below.

The number of carbon atoms of the alkynylene group is preferably 2 to 12, more preferably 2 to 8, and further preferably 2 to 4. Examples thereof include ethynylene, ethynylene methylene, and methylene ethynylene methylene. The alkynylene group may have a substituent, and examples of such a substituent include the substituents for Ra described below.

The number of carbon atoms of the cycloalkylene group is preferably 3 to 12, and more preferably 3 to 8. The number of rings of the cycloalkylene group is preferably 3 to 7, more preferably 3, 5 or 6, and further preferably 5 or 6. Examples thereof include cyclopropylene, cyclopentylene, and cyclohexylene. The cycloalkylene group may have a substituent, and examples of such a substituent include the substituents for Ra described below.

The number of carbon atoms of the cycloalkenylene group is preferably 5 to 12, and more preferably 5 to 8. The number of rings of the cycloalkenylene group is preferably 5 to 7, and more preferably 5 or 6. Examples thereof include cyclopentenylene, and cyclohexenylene. The cycloalkenylene group may have a substituent, and examples of such a substituent include the substituents for Ra described below.

The number of carbon atoms of the arylene group is preferably 6 to 12, and more preferably 6 to 8. Examples thereof include phenylene, and naphthylene. The arylene group may have a substituent, and examples of such a substituent include the substituents for Ra described below.

The number of carbon atoms of the divalent heterocyclic group is preferably 0 to 12, and more preferably 1 to 8.

The number of rings of the divalent heterocyclic group and the heterocycle of the heterocyclic group are the same as Ra described below, and their preferable ranges are also the same as Ra. The divalent heterocyclic group may have a substituent, and examples of such a substituent include the substituents for Ra described below.

Examples of the substituent for Rsa include the substituents for Ra described below.

Rsa is preferably a hydrogen atom, an alkyl group, an alkenyl group, a cycloalkyl group, a cycloalkenyl group, an aryl group, or a heterocyclic group.

Examples of the group formed by the combination of any of the alkylene group, the alkenylene group, the alkynylene group, the cycloalkylene group, the cycloalkenylene group, the arylene group, the divalent heterocyclic group, —C(=O)—, —O—, —S—, —SO$_2$—, —SO— and —N(Rsa)- include —O—C(=O)—, —C(=O)—O—, —N(Rsa)-C(=O)—, —C(=O)—N(Rsa)-, —N(Rsa)-SO$_2$—, —SO$_2$—N(Rsa)-, alkylene-O—, —O-alkylene, alkylene-O-alkylene, alkylene-S—, —S-alkylene, alkylene-S-alkylene, arylene-alkylene, alkylene-arylene, —O-arylene, and an arylene-O—.

The number of carbon atoms of the alkyl group for Rs is preferably 1 to 12, more preferably 1 to 8, and further preferably 1 to 4. Examples thereof include methyl, ethyl, isopropyl, n-propyl, n-butyl, t-butyl, n-pentyl, n-hexyl, n-octyl, 2-ethylhexyl, and n-dodecyl. The alkyl group for Rs may have a substituent, and examples of such a substituent include the substituents for Ra described below.

The number of carbon atoms of the alkenyl group for Rs is preferably 2 to 12, more preferably 2 to 8, and further preferably 2 to 4. Examples thereof include vinyl, allyl, 2-butenyl, 1,3-butadienyl, and 2-pentenyl. The alkenyl group for Rs may have a substituent, and examples of such a substituent include the substituents for Ra described below.

The number of carbon atoms of the alkynyl group for Rs is preferably 2 to 12, more preferably 2 to 8, and further preferably 2 to 4. Examples thereof include ethynyl, 2-propynyl, and 2-pentene-4-ynyl. The alkynyl group for Rs may have a substituent, and examples of such a substituent include the substituents for Ra described below.

The number of carbon atoms of the cycloalkyl group for Rs is preferably 3 to 12, and more preferably 3 to 8. The number of rings of the cycloalkyl group is preferably 3 to 7, more preferably 3, 5 or 6, and further preferably 5 or 6. Examples thereof include cyclopropyl, cyclopentyl, and cyclohexyl. The cycloalkyl group for Rs may have a substituent, and examples of such a substituent include the substituents for Ra described below.

The number of carbon atoms of the cycloalkenyl group for Rs is preferably 5 to 12, and more preferably 5 to 8. The number of rings of the cycloalkenyl group is preferably 5 to 7, and more preferably 5 or 6. Examples thereof include cyclopentenyl, and cyclohexenyl. The cycloalkenyl group for Rs may have a substituent, and examples of such a substituent include the substituents for Ra described below.

The number of carbon atoms of the aryl group for Rs is preferably 6 to 12, and more preferably 6 to 8. Examples thereof include phenyl and naphthyl. The aryl group for Rs may have a substituent, and examples of such a substituent include the substituents for Ra described below.

The number of carbon atoms of the heterocyclic group for Rs is preferably 0 to 12, and more preferably 1 to 8.

The number of rings of the heterocyclic group and the heterocycle of the heterocyclic group are the same as Ra described below, and their preferable ranges are also the same as Ra. The heterocyclic group for Rs may have a substituent, and examples of such a substituent include the substituents for Ra described below.

The ring to be formed by binding Rs and Ls to each other may be any of a saturated hydrocarbon ring, an unsaturated hydrocarbon ring, an aromatic hydrocarbon ring, and a heterocycle. The number of rings of the ring to be formed is preferably 3 to 7, more preferably 5 or 6, and particularly preferably 5.

Examples of the ring to be formed by binding Rs and Ls to each other include a 2,5-dioxotetrahydrofuran ring (maleic anhydride ring), a 2,5-dioxobenzotetrahydrofuran ring (phthalic anhydride ring), a 2,6-dioxotetrahydropyran ring, a 2,6-dioxo-1,4-dioxane ring, a 2,6-dioxomorpholine ring, and a 2,6-dioxothiomorpholine ring.

The ring to be formed may have a substituent, and examples of such a substituent include the substituents for Ra described below.

The group represented by Formula (Aanh-1) is a monovalent group and is located at a side chain or an end of the polymer.

Herein, the side chain of the polymer means a side chain group which binds to an atom constituting the polymer main chain.

In the present invention, the case where Rs and Ls bind to each other to form a ring is preferable. In this case, it is most preferable that a ring-constituent atom of the formed ring and a polymer main chain-constituent atom are directly bound.

The case where a group containing a partial structure of an acid anhydride in the polymer molecule is a group in which at least two of the hydrogen atoms of the acid anhydride have been substituted with bonds (—) is also preferable.

In the case of the group in which at least two of the hydrogen atoms of the acid anhydride has been substituted with bonds (—), this group is preferably integrated in a ring of the acid anhydride or as polymer main chain-constituent atoms.

In particular, this group is preferably integrated into the polymer main chain as a unit represented by Formula (Aanh-2).

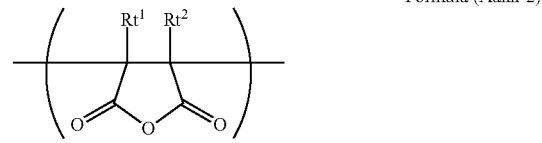

Formula (Aanh-2)

In Formula (Aanh-2), $Rt^1$ and $Rt^2$ each independently designate a hydrogen atom or a substituent. Herein, $Rt^1$ and $Rt^2$ may be bonded to each other to form a ring.

Examples of the substituent for $Rt^1$ and $Rt^2$ include the substituents for Ra described below.

$Rt^1$ and $Rt^2$ each are preferably a hydrogen atom, an alkyl group, a cycloalkyl group, an aryl group, or a heterocyclic group; more preferably a hydrogen atom, an alkyl group, or an aryl group; and further preferably a hydrogen atom or an alkyl group.

The alkyl group, the cycloalkyl group, the aryl group, and the heterocyclic group for $Rt^1$ and $Rt^2$ each have the same meanings as the alkyl group, the cycloalkyl group, the aryl group, and the heterocyclic group for Rs, and preferable ranges are also the same. These groups may have a substituent, and examples of such a substituent include the substituents for Ra described below.

The ring to be formed by binding $Rt^1$ and $Rt^2$ to each other is preferably a 5- to 7-membered ring, more preferably a 5- or 6-membered ring. In addition, a hydrocarbon ring is preferable. Among these, a cyclopentane ring and a cyclohexane ring are preferable.

As the resin having a group containing a partial structure of an acid anhydride in the polymer molecule, a resin subjected to acid modification with an unsaturated carboxylic acid anhydride, so-called unsaturated carboxylic acid anhydride-modified resin is preferable.

As the unsaturated carboxylic acid anhydride-modified resin, an unsaturated carboxylic acid anhydride-modified resin of the above-described base resin, namely a resin in which the above-described base resin has been modified with an unsaturated carboxylic acid anhydride is preferable. An unsaturated carboxylic acid anhydride-modified polyolefin resin in which the above-described polyolefin resin has been modified with an unsaturated carboxylic acid anhydride is more preferable.

Modification with the unsaturated carboxylic acid anhydride may be performed by a graft modification, or the unsaturated carboxylic acid anhydride may be integrated into the polymer main chain as a repeating unit.

Meanwhile, whether the unsaturated carboxylic acid anhydride which underwent partial hydrolysis at a step of the modification, namely at a step of the synthesis is contained, does not matter.

Among unsaturated carboxylic acid anhydrides, examples of the cyclic acid anhydride include: acid anhydrides having a maleic skeleton, such as maleic anhydride, citraconic anhydride (methylmaleic anhydride), 2,3-dimethylmaleic anhydride, 2-(2-carboxyethyl)-3-methylmaleic anhydride, 2-cyclohexene-1,2-dicarboxylic anhydride, phenyl maleic anhydride, 2,3-diphenyl maleic anhydride, 5,6-dihydro-1,4-dithiin-2,3-dicarboxylic anhydride, and 2,3-bis(2,4,5-trimethyl-3-thienyl)maleic anhydride; and acid anhydrides having a phtharic skeleton, such as 4-ethynyl phtharic anhydride, 4,4'-(ethyne-1,2-diyl)diphtharic anhydride, 4-(1-propynyl) phtharic anhydride, and 4-phenylethynyl phtharic anhydride.

Among unsaturated carboxylic acid anhydrides, examples of a linear acid anhydride include: acid anhydrides of fumaric acid, itaconic acid, acrylic acid, or methacrylic acid; and mixed acid anhydrides of these unsaturated carboxylic acids and a saturated aliphatic carboxylic acid, an aromatic carboxylic acid or a heterocyclic carboxylic acid.

In the present invention, cyclic unsaturated acid anhydrides are preferable, acid anhydrides having a maleic skeleton are more preferable, and maleic anhydride is particularly preferable.

As the maleic anhydride-modified polyolefin, a maleic anhydride-modified polyethylene, a maleic anhydride-modified polypropylene and a maleic anhydride-modified polystyrene are preferable, and a maleic anhydride-modified polyethylene and a maleic anhydride-modified polypropylene are more preferable.

Meanwhile, a maleic anhydride-modified copolymer derived from a copolymer of two types of monomers selected from any of ethylene, propylene and styrene is also preferable.

Examples of the maleic anhydride-modified polyethylene and the maleic anhydride-modified polypropylene include a maleic anhydride-modified ethylene-propylene-copolymer, a maleic anhydride-modified ethylene-α-olefin copolymer (ethylene-vinyl acetate copolymer, ethylene-hexene copolymer, ethylene-octene copolymer, or the like), and styrene/ethylene/butylene/styrene (SEBS) having a group containing a maleic anhydride. Further, as a polar group to be grafted or to be copolymerized, not only a maleic anhydride, but also a polar group [alkyleneglycol-series or (meth) acrylic acid-series monomer constituent] may be contained.

Particularly preferable amongst these compounds are a maleic anhydride-modified polyolefin (polyethylene, polypropylene, polysryrene, or their copolymer), a maleic anhydride-modified ethylene-propylene-copolymer, a maleic anhydride-modified ethylene-α-olefin copolymer (ethylene-vinyl acetate copolymer, ethylene-hexene copolymer, ethylene-octene copolymer, or the like), and styrene/ethylene/butylene/styrene (SEBS) having a group containing a maleic anhydride.

Herein, a modification method (synthetic method) for the unsaturated carboxylic acid anhydride modification is not particularly limited. A graft extrusion and a graft polymerization in a liquid in a solution system are acceptable. As a comonomer, styrene may be contained. In order to introduce the polar group, the modification method may be routed through a synthesis process by a copolymerization reaction.

The content of the resin having a group containing a partial structure of an acid anhydride in the polymer molecular is preferably 1 to 50 mass parts, more preferably 2 to 30 mass parts, and further preferably 5 to 20 mass parts, with respect to 100 mass parts of all the thermoplastic synthetic resins except for the cellulose.

The —C(=O)—O—C(=O)— moiety of the acid anhydride structure has properties of high polarity and strong hydrophilicity, and is excellent in adhesion to a polymer molecular surface having a hydrophilicity, by a dipole interaction or a hydrogen-bond interaction with a polymer molecule having a hydrophilicity in the same way. Further, particularly in a case where a hydroxyl group (—OH) is present on the polymer molecular surface having a hydrophilicity, a covalent bond is partially formed through an ester reaction, so that a stronger adhesion is achieved.

In the present invention, it is considered that because the surface of cellulose fiber is hydrophilic, the resin having a group containing a partial structure of an acid anhydride in the polymer molecular acts to the cellulose fiber, thereby to improve adhesion between the matrix resin (thermoplastic synthetic resin containing a base resin) and the cellulose.

When this phenomenon is caused, the thermoplastic synthetic resin as a whole militates for an increase in viscosity. When this is applied to Equation (1.1) of the stress (Fh) which the dispersion element gets in the shear field, described in relation to the above-described thermoplastic synthetic resin, and Equation (1.2) in relation to Equation (1.1), a force which cellulose gets in the shear field is subjected to militating for an increase in power.

Specifically, by containing the resin having a group containing a partial structure of an acid anhydride in the polymer molecular, a force applied to the cellulose in the shear field can be enforced. It is presumed that miniaturization of the cellulose is hereby facilitated and resultantly an apparent elastic modulus of the cellulose is improved.

(Apparent Elastic Modulus of Cellulose Contained in Thermoplastic Resin Composition)

In the present invention, it is preferable that when a shearing force is applied to a thermoplastic resin composition to form a uniform dispersion element, the apparent elastic modulus ($Ef_1$) of the cellulose contained in the thermoplastic resin composition is 1.1 times or more as large as the apparent elastic modulus ($Ef_0$) of the cellulose contained in a thermoplastic resin composition at the time when a shearing force is applied to a thermoplastic resin composition which does not contain a resin having a group containing a partial structure of an acid anhydride in the polymer molecular or an ionic compound to form a uniform dispersion element.

This magnification ratio ($Ef_1/Ef_0$) is preferred with increase in this value, 1.2 times or more is more preferable, 1.3 times or more is still more preferable, 1.4 times or more is particularly preferable, and 1.5 times or more is most preferable. Further, it is realistic that the upper limit is 15 times or less.

Meanwhile, the apparent elastic modulus of the cellulose contained in the thermoplastic resin composition can be measured as follows.

Injection molding is performed using the cellulose-reinforced thermoplastic resin composition to prepare a bending test specimen (4 mm in thickness×80 mm in length). Meanwhile, the injection molding is performed under the molding conditions that are considered to be proper in general.

The bending elastic modulus is calculated according to JIS K 7171. The density is compliant with JIS K 7112. However, as a measurement solvent, ethanol is used instead of water.

From the obtained density, the volume fraction of each constituent of the synthetic resin and cellulose is calculated.

Meanwhile, the density and the elastic modulus of just the synthetic resin are calculated separately according to JIS K 7112 and JIS K 7171.

The apparent elastic modulus Ef of the cellulose can be calculated from Equation (2.2) modified from Equation (2.1).

Meanwhile, Em is ordinarily calculated from Equation (3.1) in a case where the matrix resin is a single system or is viewed to be a substantially single system.

In the present invention, because the matrix resin is composed of at least two types of resins, Em is calculated from Equation (4.1) based on the Law of mixture on the condition of the following equation (4.2).

The obtained elastic modulus is defined as $Ef_1$.

$$Ec = EmVm + EfVf \quad (2.1)$$

$$Ef = \{Ec - Em(1-Vf)\}/Vf \quad (2.2)$$

Herein, Ec is a Young's modulus (elastic modulus) of the bending test specimen of the composite material. Em is a Young's modulus (elastic modulus) of the thermoplastic synthetic resin of the base material. Ef is a Young's modulus (elastic modulus) of the cellulose of the fiber.

Vm is a volumetric ratio of the thermoplastic synthetic resin of the base material. Vf is a volumetric ratio of the cellulose of the fiber. These volumetric ratios are calculated from their densities.

On the other hand, in a case where the matrix resin is a single system or is viewed to be a substantially single system, since the volume fraction of the composite material is 1, the volume fraction of the cellulose is calculated from Equation (3.1).

$$Vm = 1 - Vf \quad (3.1)$$

In a case where the matrix resin is not viewed to be a substantially single system (the case where it is considered that a mixture of two types also has a lot of influence to elastic modulus due to its mixed amount), after defining elastic modulus of each constituent from Equation (4.1) on the condition of conformity to Law of mixture even in a matrix resin, finally the apparent elastic modulus of the cellulose is calculated from Equation (2.2).

Herein, the sum of Vp of each constituent is 1, in other words, fulfills Equation (4.2).

$$Em = \sum_{p=1}^{n} EpVp \quad (4.1)$$

$$\sum_{p=1}^{n} Vp = 1 \quad (4.2)$$

Herein, regarding each constituent, Ep is a Young's modulus (elastic modulus) of the constituent p, and Vp is a volume fraction of the constituent p which is measured from its density. Meanwhile, the number of existing constituents is from 1 to n in which n is the maximum number of the existing constituent.

On the other hand, also for a thermoplastic resin composition in which both an acid-modified thermoplastic synthetic resin and an ionic compound are removed (in a case where only either of them exists, either the existing acid-modified thermoplastic synthetic resin or ionic compound is removed) from the above-described thermoplastic resin composition, the apparent elastic modulus Ef of the cellulose is calculated in the same way. The elastic modulus in this case is defined as $Ef_0$.

Based on each of the elastic modulus, $Ef_1$ and $Ef_0$ obtained by the above, the magnification ratio ($Ef_1/Ef_0$) of $Ef_1$ to $Ef_0$ is calculated.

<Cellulose>

The cellulose used in the present invention is fibrous cellulose, preferably plant fiber-derived cellulose, and particularly preferably fine plant fibrous cellulose (powdered pulp).

The pulp is also a raw material for paper and consists primarily of a tracheid which is extracted from a plant. From a chemical viewpoint, a primary constituent of the pulp is a polysaccharide and its primary constituent is cellulose.

The plant fiber-derived cellulose is not particularly limited, and specific examples thereof include a material derived from plant, such as wood, bamboo, hemp, jute, kenaf, agricultural product remains or wastes (for example, straw of wheat or rice plant, corn, stalks of cotton, and sugar cane), cloth, regenerated pulp, and waste paper. In the present invention, a wood or a material derived from the wood is preferable, and a kraft pulp is particularly preferable.

Meanwhile, the kraft pulp is a collective term of the pulp in which lignin-hemicellulose has been removed from a wood or a plant raw material by a chemical processing with caustic soda or the like, whereby almost pure cellulose has been extracted.

In the present invention, by kneading the thermoplastic synthetic resin, miniaturization of the cellulose is realized.

In the plant fiber-derived cellulose, from 30 to 40 molecules are bundled to form a high-crystalline micro-fibril having a micro-width of about 3 nm in diameter and a length of several hundred nm to several ten μm, and form a structure in which these are in a bundle through a soft non-crystalline portion. The powdered cellulose (pulverized pulp) used as a raw material in the present invention is an aggregate in this bundle form. Meanwhile, it is the that the micro-fibril is in the state that the constituent cellulose molecular chain extends itself and forms a chain crystal, whereby the micro-fibril exhibits an extremely high elastic modulus and has ideally an elastic modulus of nearly 140 GPa. Further, it is known that the elastic modulus of the cellulose increase with decreasing fiber diameter. Accordingly, in order to improve the properties of the reinforced resin, its effectiveness increases with decrease in the fiber diameter and advancement in miniaturization of the cellulose dispersed in the thermoplastic synthetic resin.

In the present invention, the miniaturized cellulose is preferably a rod-like fiber.

A short side length (diameter) is preferably 2 μm or less, more preferably from 3 nm to 2 μm, more preferably from 3 nm to 1 μm, further preferably from 3 nm to 0.5 μm, and particularly preferably from 4 to 300 nm. On the other hand, a long side length (length) is preferably from 0.03 to 500 μm, and more preferably from 0.05 to 200 μm. An aspect ratio is preferably 5 or more, and more preferably 10 to 1,000. In addition, the aspect ratio is expressed in terms of a value obtained by dividing the average length by the average fiber diameter.

Further, in the present invention, as for the miniaturized cellulose, 15% or more of the cellulose fiber to be contained preferably has a short side length of 2 μm or less. The content of the cellulose fiber having a short side length of 2 μm or less is more preferably 20% or more, and further preferably 25% or more.

In the present invention, the content of the cellulose is preferably from 1 to 100 parts by mass, more preferably from 5 to 70 parts by mass, and further preferably from 10 to 50 parts by mass, with respect to 100 parts by mass of the thermoplastic synthetic resin.

If the content of the cellulose is less than 1 part by mass, transmission of power to the cellulose is not effectively caused during kneading, whereby it is difficult to obtain substantially miniaturized cellulose. In reverse, if the content of the cellulose is more than 100 parts by mass, an improved dispersion of the cellulose in the thermoplastic synthetic resin becomes difficult. Consequently, a good property for its use as a material cannot be obtained.

<Ionic Compound>

The thermoplastic resin composition of the present invention may contain an ionic compound together with the cellulose.

As the ionic compound that can be used in the present invention, a compound which is generally called as an ionic liquid is preferable.

The ionic liquid is a salt which is present as a liquid in a broad temperature range and is a liquid consisting only of an ion. In general, a salt having a melting point of 100° C. or less is defined as the ionic liquid (IL) and an ionic liquid having a melting point at near room temperature is called as "RTIL (room temperature IL)".

As the ionic compound that can be used in the present invention, a compound which is generally called as an ionic liquid is preferable. However, whether or not the melting point is more than 100° C., for example, 150° C. or more does not matter.

Specifically, in the present invention, since the cellulose is miniaturized by kneading a cellulose-reinforced resin or a cellulose-reinforced resin composition in a processing machine at the step of processing and molding the same by extrusion, injection or the like, the temperature of the working step and the processing machine can be set to a temperature which is equal to or higher than the melting point of the ionic compound. Accordingly, for example, even if the melting point of the ionic compound is 180° C., the ionic compound can hold a promise of the same function as the so-called ionic liquid by processing at a temperature which is higher than 180° C., for example, at 190° C.

In the present invention, the ionic compound is preferably an organic ionic compound, and preferred examples thereof include onium salts, such as a quaternary phosphonium salt and a quaternary ammonium salt. Among these, a compound represented by Formula (1) or (2) is preferable.

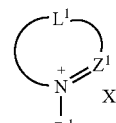

Formula (1)

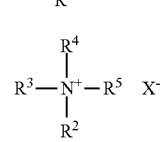

Formula (2)

In Formulas (1) and (2), $Z^1$ designates =C(Ra)- or =N—. Herein, Ra designates a hydrogen atom or a substituent. $L^1$ designates a divalent linking group. $R^1$ to $R^5$ each independently designate an alkyl group, an alkenyl group, a cycloalkyl group, an aryl group or a heterocyclic group. At least two of $R^2$ to $R^5$ may be bonded to each other to form a ring. $X^-$ designates an anion.

$Z^1$ is =C(Ra)- or =N—, and preferably =C(Ra)-.

Examples of the substituent for Ra include an alkyl group, an alkenyl group, a cycloalkyl group, an aryl group, a heterocyclic group, an alkoxy group, an aryloxy group, an alkylthio group, an arylthio group, an amino group, an acyl group, an acylamino group, a sulfonamide group, a carbamoyl group, a sulfamoyl group, an alkoxycarbonyl group, an aryloxycarbonyl group, an acyloxy group, a sulfonyl group, a halogen atom, a hydroxy group, a carboxy group, and a sulfo group.

The number of carbon atoms of the alkyl group is preferably 1 to 20, more preferably 1 to 12, and further preferably 1 to 8.

Examples of the alkyl group include methyl, ethyl, n-propyl, isopropyl, n-butyl, isobutyl, t-butyl, n-pentyl, t-pentyl, n-hexyl, n-pentyl, n-octyl, 2-ethylhexyl, n-octyl, n-decyl, n-dodecyl, n-hexadecyl, and n-octadecyl.

The alkyl group may have a substituent, and examples of such a substituent include the substituents for Ra.

The number of carbon atoms of the alkenyl group is preferably 2 to 20, more preferably 2 to 12, and further preferably 2 to 8.

Examples of the alkenyl group include vinyl, allyl, and oleyl.

The alkenyl group may have a substituent, and examples of such a substituent include the substituents for Ra.

The cycloalkyl group is preferably a 3- to 7-membered cycloalkyl group, more preferably a 3-, 5- or 7-membered cycloalkyl group, and further preferably 5- or 6-membered cycloalkyl group.

The number of carbon atoms of the cycloalkyl group is preferably 3 to 20, more preferably 3 to 12, further preferably 5 to 12, and particularly preferably 5 to 8.

Examples of the cycloalkyl group include cyclopropyl, cyclopentyl, and cyclohexyl.

The cycloalkyl group may have a substituent, and examples of such a substituent include the substituents for Ra.

The number of carbon atoms of the aryl group is preferably 6 to 20, more preferably 6 to 12, and further preferably 6 to 8.

Examples of the aryl group include phenyl and naphthyl.

The aryl group may have a substituent, and examples of such a substituent include the substituents for Ra.

As the heterocycle of the heterocyclic group, it is preferable that a hetero atom which constitutes the heterocycle is selected from the group consisting of an oxygen atom, a sulfur atom and a nitrogen atom, and the heterocycle is a 5- or 7-membered ring. In addition, the heterocycle may be an aromatic ring, an unsaturated ring, or a saturated ring.

The number of carbon atoms of the heterocyclic group is preferably 0 to 20, more preferably 1 to 12, and further preferably 1 to 8.

The heterocycle of the heterocyclic group include a furan ring, a thiophene ring, a pyrrole ring, an imidazole ring, a pyrazole ring, a triazole ring, a tetrazole ring, an oxazole ring, a thiazole ring, a pyridine ring, a pyrazine ring, a pyrimidine ring, a pyridazine ring, a triazine ring, an indoline ring, a tetrahydrofuran ring, a tetrahydrothiophene ring, a pyrrolidine ring, a pyrrolidine ring, an imidazolidine ring, an imidazoline ring, a pyrazolidine ring, a piperidine ring, a piperazine ring, a morpholine ring, a thiomorpholine ring, a 1,1-dioxothiomorpholine ring, a 1-oxomorpholine ring, a quinuclidine ring, a 1,4-diazabicyclo[2.2.2]octane ring, and a cyanuric acid ring.

Further, the heterocycle also includes benzene ring- or other ring-condensed heterocycles, such as a benzofuran ring, a benzothiophene ring, a benzoimidazole ring, a benzopyrazole ring, a benzotriazole ring, a benzooxazole ring, and a benzothiazole ring.

The heterocyclic group may have a substituent, and examples of such a substituent include the substituents for Ra.

The number of carbon atoms of the alkoxy group is preferably 1 to 20, more preferably 1 to 12, and further preferably 1 to 8.

Examples of the alkoxy group include methoxy, ethoxy, n-propoxy, isopropoxy, n-butoxy, isobutoxy, t-butoxy, n-pentyloxy, t-pentyloxy, n-hexyloxy, n-pentyloxy, n-octyloxy, 2-ethylhexyloxy, n-octyloxy, n-decyloxy, n-dodecyloxy, n-hexadecyloxy, and n-octadecyloxy.

The alkoxy group may have a substituent, and examples of such a substituent include the substituents for Ra.

The number of carbon atoms of the aryloxy group is preferably 6 to 20, more preferably 6 to 12, and further preferably 6 to 8.

Examples of the aryloxy group include phenoxy and naphthoxy.

The aryloxy group may have a substituent, and examples of such a substituent include the substituents for Ra.

The number of carbon atoms of the alkylthio group is preferably 1 to 20, more preferably 1 to 12, and further preferably 1 to 8.

Examples of the alkylthio group include methylthio, ethylthio, n-propylthio, isopropylthio, n-butylthio, isobutylthio, t-butylthio, n-pentylthio, t-pentylthio, n-hexylthio, n-pentylthio, n-octylthio, 2-ethylhexylthio, n-octylthio, n-decylthio, n-dodecylthio, n-hexadecylthio, and n-octadecylthio.

The alkylthio group may have a substituent, and examples of such a substituent include the substituents for Ra.

The number of carbon atoms of the arylthio group is preferably 6 to 20, more preferably 6 to 12, and further preferably 6 to 8.

Examples of the arylthio group include phenylthiol and naphthylthio.

The arylthio group may have a substituent, and examples of such a substituent include the substituents for Ra.

The amino group include an amino group, an alkylamino group, an arylamino group, and a heterocyclic amino group. The number of carbon atoms of the amino group is preferably 0 to 20, more preferably 0 to 12, further preferably 1 to 12, and particularly preferably 1 to 8.

Examples of the amino group include amino, methylamino, dimethylamino, ethylamino, diethylamino, isopropylamino, di-n-propylamino, 2-ethylhexylamino, n-octylamino, dodecylamino, phenylamino, diphenylamino, and phenylmethylamino.

The amino group may have a substituent, and examples of such a substituent include the substituents for Ra.

The acyl group include a formyl group, an alkanoyl group, a cycloalkanoyl group, an alkenoyl group, an aryloyl group, and a heterocyclic carbonyl group.

The number of carbon atoms of the acyl group is preferably 1 to 20, more preferably 2 to 12, further preferably 2 to 12, and particularly preferably 2 to 8.

Examples of the acyl group include formyl, acetyl, propionyl, butyryl, valeryl, pivaloyl, lauroyl, palmitoyl, stearoyl, cyclopropylcarbonyl, cyclopentylcarbonyl, cyclohexylcarbonyl, acryloyl, methacryloyl, oleyl, benzoyl, naphthoyl, nicotinoyl, and isonicotinoyl.

The acyl group may have a substituent, and examples of such a substituent include the substituents for Ra.

Examples of the acylamino group include amino groups in which the above-described acyl group is substituted with a nitrogen atom. The number of carbon atoms of the acylamino group is preferably 1 to 20, more preferably 2 to 12, further preferably 2 to 12, and particularly preferably 2 to 8.

Examples of the acylamino group include formylamino, acetylamino, propionylamino, butyrylamino, valerylamino, pivaloylamino, lauroylamino, palmitoylamino, stearoylamino, cyclopropylcarbonyl amino, cyclopentylcarbonyl amino, cyclohexylcarbonyl amino, acryloylamino, methacryloylamino, oleylamino, benzoylamino, naphthoylamino, nicotinoylamino, and isonicotinoylamino.

The acylamino group may have a substituent, and examples of such a substituent include the substituents for Ra.

The sulfonamide group include an alkylsulfonamide group, a cycloalkylsulfonamide group, an arylsulfonamide group, and a heterocyclic sulfonamide group.

The number of carbon atoms of the sulfonamide group is preferably 1 to 20, more preferably 2 to 12, further preferably 2 to 12, and particularly preferably 2 to 8.

Examples of the sulfonamide group include methanesulfonamide, ethanesulfonamide, propanesulfonamide, octanesulfonamide, cyclopentanesulfonamide, cyclohexanesulfonamide, benzenesulfonamide, and naphthalenesulfonamide.

The sulfonamide group may have a substituent, and examples of such a substituent include the substituents for Ra.

The carbamoyl group include a carbamoyl group, an alkylcarbamoyl group, a cycloalkylcarbamoyl group, an arylcarbamoyl group, and a heterocyclic carbamoyl group.

The number of carbon atoms of the carbamoyl group is preferably 1 to 20, more preferably 2 to 12, further preferably 2 to 12, and particularly preferably 2 to 8.

Examples of the carbamoyl group include N-methylcarbamoyl, N,N-dimethylcarbamoyl, N-phenylcarbamoyl, N-phenyl-N-methylcarbamoyl, N-cyclohexylcarbamoyl, N-imidazolylcarbamoyl, pyrrolidinecarbonyl, and piperidinecarbonyl.

The carbamoyl group may have a substituent, and examples of such a substituent include the substituents for Ra.

The sulfamoyl group include a sulfamoyl group, an alkylsulfamoyl group, a cycloalkylsulfamoyl group, an arylsulfamoyl group, and a heterocyclic sulfamoyl group.

The number of carbon atoms of the sulfamoyl group is preferably 0 to 20, more preferably 1 to 12, further preferably 1 to 12, and particularly preferably 1 to 8.

Examples of the sulfamoyl group include N-methylsulfamoyl, N,N-dimethylsulfamoyl, N-phenylsulfamoyl, N-phenyl-N-methylsulfamoyl, N-cyclohexylsulfamoyl, N-imidazolylsulfamoyl, pyrrolidinesulfamoyl, piperidinesulfamoyl.

The sulfamoyl group may have a substituent, and examples of such a substituent include the substituents for Ra.

The number of carbon atoms of the alkoxycarbonyl group is preferably 2 to 20, more preferably 2 to 12, and further preferably 2 to 8.

Examples of the alkoxycarbonyl group include methoxycarbonyl, ethoxycarbonyl, n-propoxycarbonyl, isopropoxycarbonyl, n-butoxycarbonyl, isobutoxycarbonyl, t-butoxycarbonyl, n-pentyloxycarbonyl, t-pentyloxycarbonyl, n-hexyloxycarbonyl, n-pentyloxycarbonyl, n-octyloxycarbonyl, 2-ethylhexyloxycarbonyl, n-octyloxycarbonyl, n-decyloxycarbonyl, n-dodecyloxycarbonyl, n-hexadecyloxycarbonyl, and n-octadecyloxycarbonyl.

The alkoxycarbonyl group may have a substituent, and examples of such a substituent include the substituents for Ra.

The number of carbon atoms of the aryloxycarbonyl group is preferably 7 to 20, and more preferably 7 to 12.

Examples of the aryloxycarbonyl group include phenoxycarbonyl, and naphthoxycarbonyl.

The aryloxycarbonyl group may have a substituent, and examples of such a substituent include the substituents for Ra.

The acyloxy group include a formyloxy group, an alkanoyloxy group, a cycloalkanoyloxy group, an alkenoyloxy group, an aryloyloxy group, and a heterocyclic carbonyloxy group.

The number of carbon atoms of the acyloxy group is preferably 1 to 20, more preferably 2 to 12, further preferably 2 to 12, and particularly preferably 2 to 8.

Examples of the acyloxy group include formyloxy, acetyloxy, propionyloxy, butyryloxy, valeryloxy, pivaloyloxy, lauroyloxy, palmitoyloxy, stearoyloxy, cyclopropylcarbonyloxy, cyclopentylcarbonyloxy, cyclohexylcarbonyloxy, acryloyloxy, methacryloyloxy, oleyloxy, benzoyloxy, naphthoyloxy, nicotinoyloxy, and isonicotinoyloxy.

The acyloxy group may have a substituent, and examples of such a substituent include the substituents for Ra.

The sulfonyl group include an alkylsulfonyl group, a cycloalkylsulfonyl group, an arylsulfonyl group, and a heterocyclic sulfonyl group.

The number of carbon atoms of the sulfonyl group is preferably 1 to 20, more preferably 2 to 12, further preferably 2 to 12, and particularly preferably 2 to 8.

Examples of the sulfonyl group include methanesulfonyl, ethanesulfonyl, propanesulfonyl, octanesulfonyl, cyclopentanesulfonyl, cyclohexanesulfonyl, benzenesulfonyl, and naphthalenesulfonyl.

The sulfonyl group may have a substituent, and examples of such a substituent include the substituents for Ra.

Examples of the halogen atom include a fluorine atom, a chlorine atom, a bromine atom and an iodine atom.

Ra is preferably a hydrogen atom, an alkyl group, a cycloalkyl group, an aryl group, a heterocyclic group, an alkoxy group, an alkylthio group, or an amino group; more preferably a hydrogen atom, an alkyl group, a cycloalkyl group, or an aryl group; further preferably a hydrogen atom, or an alkyl group; and particularly preferably a hydrogen atom.

$L^1$ is a divalent linking group, preferably a linking group for forming a 5- or 6-membered nitrogen-containing heterocycle, more preferably a linking group for forming a 5- or 6-membered nitrogen-containing heteroaromatic ring, and particularly preferably a linking group for forming a 5-membered nitrogen-containing heteroaromatic ring, with —$N^+(R^1)=Z^1$—.

Herein, the formed nitrogen-containing heterocycle described above may be condensed with a benzene ring or another ring, and may be substituted with a substituent. Examples of such a substituent include the substituents for Ra.

As the divalent linking group in $L^1$, a linking group in which a linking atom is selected from the group consisting of a carbon atom, an oxygen atom, a sulfur atom and a nitrogen atom, is preferable.

Examples of the ring formed by the divalent linking group in $L^1$ and the —$N^+(R^1)=Z^1$— include an imidazole ring, a pyrazole ring, a triazole ring, a tetrazole ring, an oxazole ring, a thiazole ring, a pyridine ring, a pyrazine ring, a pyrimidine ring, a pyridazine ring, a triazine ring, a 1-pyrrolidine ring, an imidazoline ring, and a benzene-condensed ring thereof.

The alkyl group, the alkenyl group, the cycloalkyl group, the aryl group, and the heterocyclic group for $R^1$ to $R^5$ have the same meanings as the alkyl group, the alkenyl group, the cycloalkyl group, the aryl group, and the heterocyclic group for Ra, and preferable ranges are also the same.

The ring to be formed by binding at least two of $R^2$ to $R^5$ to each other is preferably 5- or 7-membered ring, and more preferably 5- or 6-membered ring. In addition, the ring to be formed may be an aromatic ring, an unsaturated ring, or a saturated ring; and is preferably a saturated ring.

Examples of the ring to be formed by binding two of $R^2$ to $R^5$ to each other include a pyrrolidine ring, a pyrroline ring, a pyrazolidine ring, a pyrazoline ring, a pyrrole ring, a piperidine ring, a piperazine ring, a morpholine ring, a thiomorpholine ring, a 1,1-dioxothiomorpholine ring, and a 1-oxomorpholine ring.

Examples of the ring to be formed by binding three of $R^2$ to $R^5$ to each other include a quinuclidine ring, and a 1,4-diazabicyclo[2.2.2]octane ring.

Specific examples of the cation (a portion other than $X^-$) of the compound represented by Formula (1) or (2) include the following cations:

1-alkyl-3-methyl imidazolium, such as 1-ethyl-3-methyl imidazolium, 1-butyl-3-methyl imidazolium, 1-hexyl3-methyl imidazolium, 1-octyl-3-methyl imidazolium; 1,3-dimethyl imidazolium, 1,3-diethyl imidazolium, 1,2,3-trimethyl imidazolium, 1,2,3,4-tetramethyl imidazolium, 1,3,4-trimethyl-2-ethyl imidazolium, 1,3-dimethyl-2,4-diethyl imidazolium, 1,2-dimethyl-3,4-diethyl imidazolium, 1-methyl-2,3,4-triethyl imidazolium, 1,2,3,4-tetraethyl imidazolium, 1,3-dimethyl-2-ethyl imidazolium, 1-ethyl-2,3-dimethyl imidazolium, 1,2,3-triethyl imidazolium, 1-ethyl-2,3-dimethyl imidazolium, 1-propyl-2,3-dimethyl imidazolium, 1-butyl-2,3-dimethyl imidazolium, 1-pentyl-2,3-dimethyl imidazolium, 1-hexyl-2,3-dimethyl imidazolium, 1-heptyl-2,3-dimethyl imidazolium, 1-octyl-2,3-dimethyl imidazolium, 1-cyanomethyl-3-methyl imidazolium, 1-(2-hydroxyethyl)-3-methyl imidazolium, 1-allyl-3-methyl imidazolium, 1-butyl pyridinium, 1-hexyl pyridinium, N-(3-hydroxypropyl)pyridinium, N-hexyl-4-dimethylamino pyridinium, N-(methoxyethyl)-N-methyl morpholium, 1-(2-methoxyethyl)-1-methyl pyrrolidinium, 1-(methoxyethyl)-1-methyl piperidinium, N-(methoxyethyl)-1-methyl pyrrolidinium, 1,2-dimethyl pyrazolium, N-(methoxyethyl)-2-methyl oxazolium, N-(methoxyethyl)-2-methyl thiazolium, 1,2,3-trimethyl imidazolinium, 1,2,3,4-tetramethyl imidazolinium, 1,3,4-trimethyl-2-ethyl imidazolinium, 1,3-dimethyl-2,4-diethyl imidazolinium, 1,2-dimethyl-3,4-diethyl imidazolinium, 1-methyl-2,3,4-triethyl imidazolinium, 1,2,3,4-tetraethyl imidazolinium, 1,3-dimethyl-2-ethyl imidazolinium, 1-ethyl-2,3-dimethyl imidazolinium, 1,2,3-triethyl imidazolinium, 1,1-dimethyl-2-heptyl imidazolinium, 1,1-dimethyl-2-(2-heptyl) imidazolinium, 1,1-dimethyl-2-(3-heptyl) imidazolinium, 1,1-dimethyl-2-(4-heptyl) imidazolinium, 1,1-dimethyl-2-dodecyl imidazolinium, 1,1-dimethyl imidazolinium, 1,1,2-trimethyl imidazolinium, 1,1,2,4-tetramethyl imidazolinium, 1,1,2,5-tetramethyl imidazolinium, 1,1,2,4,5-pentamethyl imidazolinium, tetramethyl ammonium, ethyl trimethyl ammonium, diethyl dimethyl ammonium, triethyl methyl ammonium, tetraethyl ammonium, trimethyl propyl ammonium, diethylmethyl(2-methoxyethyl) ammonium, N,N-diethyl-N-methyl-N-(2-methoxyethyl) ammonium, N-ethyl-N,N-dimethyl-2-methoxyethyl ammonium, trimethylbenzyl ammonium, N,N-bis(2-methoxyethyl) pyrrolidinium, N,N-bis(2-hydroxyethyl) pyrrolidinium, N-methyl-N-2-methoxyethyl pyrrolidinium, N,N-bis(2-ethylhexyl) morpholinium, N,N-bis(2-ethylhexyl) thiomorpholinium, N,N-bis(2-hydroxyethyl) piperidinium, N,N,N',N'-tetra(2-hydroxyethyl) piperazinium, N,N-bis(2-ethoxyethyl-1,1-dioxo thiomorpholinium, N,N-bis(2-ethoxyethyl-1-oxo thiomorpholinium, 1,3-dimethyl-1,4,5,6-tetrahydro pyridinium, 1,2,3-trimethyl-1,4,5,6-tetrahydro pyridinium, 1,2,3,4-tetramethyl-1,4,5,6-tetrahydro pyridinium, 1,2,3,5-tetramethyl-1,4,5,6-tetrahydro pyridinium, 1-methyl quinuclidine, 1-ethyl quinuclidine, 1-(2-hydroxyethyl) quinuclidine, 8-methyl-1,8-diazabicyclo[5.4.0]-7-undecenium, 5-methyl-1,5-diazabicyclo[4.3.0]-5-nonenium, 8-ethyl-1,8-diazabicyclo[5.4.0]-7-undecenium, and 5-ethyl-1,5-diazabicyclo[4.3.0]-5-nonenium.

The anion for $X^-$ may be any of an inorganic anion and an organic anion. Examples of the inorganic anion include a halogen ion ($F^-$, $Cl^-$, $Br^-$, $I^-$), a sulfonic acid anion ($HSO_4^-$, $SO_4^{2-}$), a phosphate anion [$P(=O)(OH)_2(O^-)$, $P(=O)(OH)(O^-)_2$, $P(=O)(O^-)_3$], a phosphonic acid anion [$HP(=O)(OH)(O^-)$, $HP(=O)(O^-)_2$], a tetrafluoroborate ($PF_6^-$), $BF_4^-$, $AsF_6^-$, $SbF_6^-$, $ClO_4^-$, $AlF_4^-$, $AlCl_4^-$, $TaF_6^-$, $NbF_6^-$, $SiF_6^-$, $CN^-$, and $F(HF)_n^-$ (n is an integer of 1 to 4).

Examples of the organic anion include an organic carboxylic acid anion, an organic sulfonic acid anion, an organic phosphoric acid anion, an organic phosphonic acid anion, a dicyanamide ion [$N^-(CN)_2$], an organic imide ion, an organic methide anion, an organic phosphorus anion, and an organic boron anion.

As the organic carboxylic acid anion or the organic sulfonic acid anion, any of an aliphatic carboxylic acid or sulfonic acid anion, an aromatic carboxylic acid or sulfonic acid anion, and a heterocyclic carboxylic acid or sulfonic acid anion is acceptable. Further, a polyvalent carboxylic acid or sulfonic acid anion (polyvalent anion) such as a dicarboxylic acid or a disulfonic acid is also acceptable.

A preferable anion of the organic carboxylic acid anion is represented by Formula (A).

Further, a preferable anion of the organic sulfonic acid anion is represented by Formula (B).

$$Rb-CO_2^- \quad \text{Formula (A1)}$$

$$Rc-SO_3^- \quad \text{Formula (A2)}$$

In Formulas (A1) and (A2), Rb designates a hydrogen atom, an alkyl group, a cycloalkyl group, an alkenyl group, an aryl group, or a heterocyclic group; and Rc designates an alkyl group, a cycloalkyl group, an alkenyl group, an aryl group, or a heterocyclic group.

The alkyl group, the cycloalkyl group, the alkenyl group, the aryl group and the heterocyclic group for Rb and Rc each have the same meanings as the alkyl group, the cycloalkyl group, the alkenyl group, the aryl group and the heterocyclic group for Ra. In addition, the alkyl group, the cycloalkyl group, the alkenyl group, the aryl group and the heterocyclic group may have a substituent, and examples of such a substituent include the substituents for Ra.

Examples of the organic carboxylic acid anion include a formic acid anion, an acetic acid anion, a propionic acid anion, a butyric acid anion, an isobutyric acid anion, a valeric acid anion, an isovaleric acid anion, a pivalic acid anion, a lauric acid anion, a myristic acid anion, a palmitic acid anion, a stearic acid anion, a trifluoroacetic acid anion, a trichloroacetic acid anion, an amino acid anion (e.g., each anion of glycine, glutamine, glutamic acid, arginine, arginic acid, asparagine, aspartic acid, cysteine, proline, serine, tyrosine, valine, leucine, isoleucine, methionine, phenylalanine, tryptophan, histidine, threonine, and lysine), an acrylic acid anion, a methacrylic acid anion, a crotonic acid anion, an isocrotonic acid anion, an oleic acid anion, a cinnamic acid anion, a cyclopropanecarboxylic acid anion, a cyclopentanecarboxylic acid anion, a cyclohexanecarboxylic acid anion, a benzoic acid anion, a toluic acid anion, a naphthalenecarboxylic acid anion, a nicotinic acid anion, an isonicotinic acid anion, a furoic acid (full acid) anion, thenoic acid anion, an oxalic acid mono- or di-anion, a malonic acid mono- or di-anion, a succinic acid mono- or di-anion, a glutaric acid mono- or di-anion, an adipic acid mono- or di-anion, a pimelic acid mono- or di-anion, a suberic acid mono- or di-anion, an azelaic acid mono- or di-anion, a sebacic acid mono- or di-anion, a maleic acid mono- or di-anion, a fumaric acid mono- or di-anion, a citraconic acid mono- or di-anion, a mesaconic acid mono- or di-anion, a phthalic acid mono- or di-anion, a terephthalic acid mono- or di-anion, an isophthalic acid mono- or di-anion, a camphoric acid mono- or di-anion, a 1,4-naphthalenedicarboxylic acid mono- or di-anion, a trimellitic acid mono-, di- or tri-anion, a pyromellitic acid mono- to tetra-anion, and a mellitic acid mono- to hexa-anion.

Examples of the organic sulfonic acid anion include a methanesulfonic acid anion, an ethanesulfonic acid anion, a propanesulfonic acid anion, an octanesulfonic acid anion, a 2-ethylhexanesulfonic acid anion, a cyclohexanesulfonic acid anion, a benzenesulfonic acid anion, a toluenesulfonic acid anion, a naphthalenesulfonic acid anion, a 4,6-disulfo- 1-naphthalenesulfonic acid mono-, di- or tri-anion, and an o-sulfobenzenecarboxylic acid mono- or di-anion.

The organic phosphate or phosphonic acid anion is preferably an anion represented by Formula (A3).

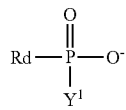

Formula (A3)

In Formula (A3), Rd designates a hydrogen atom, an alkyl group, a cycloalkyl group, an alkenyl group, an aryl group, a heterocyclic group, an alkoxy group, or an aryloxy group. $Y^1$ designates $-O^-$ or $-ORe$. Herein Re designates a hydrogen atom, an alkyl group, a cycloalkyl group, an alkenyl group, an aryl group, or a heterocyclic group.

The alkyl group, the cycloalkyl group, the alkenyl group, the aryl group, the heterocyclic group, the alkoxy group and the aryloxy group for Rd each have the same meanings as the alkyl group, the cycloalkyl group, the alkenyl group, the aryl group, the heterocyclic group, the alkoxy group and the aryloxy group for Ra. The alkyl group, the cycloalkyl group, the alkenyl group, the aryl group and the heterocyclic group for Re each have the same meanings as the alkyl group, the cycloalkyl group, the alkenyl group, the aryl group and the heterocyclic group for Ra.

Examples of the organic phosphate or phosphonic acid anion include a methylphosphonic acid mono- or di-anion, an ethylphosphonic acid mono- or di-anion, a propylphosphonic acid mono- or di-anion, a heptylphosphonic acid mono- or di-anion, a hexylphosphonic acid mono- or di-anion, a decylphosphonic acid mono- or di-anion, an octylphosphonic acid mono- or di-anion, a vinylphosphonic acid mono- or di-anion, an aminomethylphosphonic acid mono- or di-anion, a phenylphosphonic acid mono- or di-anion, a methylenediphosphonic acid mono- to tetra-anion, a nitrilotris(methylenephosphonic acid) mono- to hexa-anion, a 1,4-phenylenediphosphonic acid mono- to tetra-anion, a 4-phosphonobutyric acid mono-, di- or tri-anion, a p-xylylenediphosphonic acid mono- to tetra-anion, a monomethyl phosphate mono- or di-anion, a diethyl phosphate anion, a dibutyl phosphate anion, a didecyl phosphate anion, a diphenyl phosphate anion, and a phenyl phosphate mono- or di-anion.

Preferable anions of the organic imide ion, the organic methide anion, the organic phosphorus anion and the organic boron anion are represented by any of Formulas (A4) to (A7).

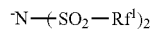

Formula (A4)

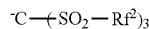

Formula (A5)

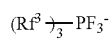

Formula (A6)

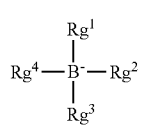

Formula (A7)

In Formulas (A4) to (A7), $Rf^1$ to $Rf^3$ designate an alkyl group substituted with a fluorine atom, or an aryl group substituted with a fluorine atom. Two $Rf^1$'s may be the same or different from each other, three $Rf^2$'s may be the same or different from each other, and three $Rf^3$'s may be the same or different from each other. $Rg^1$ to $Rg^4$ each independently designate an alkyl group, a cycloalkyl group, or an aryl group.

The number of carbon atoms of the alkyl group substituted with a fluorine atom for $Rf^1$ to $Rf^3$ is preferably 1 to 20, more preferably 1 to 12, further preferably 1 to 8, and particularly preferably 1 or 2.

The alkyl group substituted with a fluorine atom is an alkyl group substituted with at least one fluorine atom, preferably a perfluoroalkyl group.

Examples of the alkyl group substituted with a fluorine atom include perfluoromethyl, perfluoroethyl, perfluoropropyl, perfluorobutyl, perfluoropentyl, perfluorohexyl, perfluorooctyl, perfluoro 2-ethylhexyl, difluoromethyl, 2,2,2-trifluoroethyl, 1,1-difluoroethyl, 1,1,2-trifluoroethyl, 1,1,2,2-tetrafluoroethyl, and perfluorobenzyl.

The number of carbon atoms of the aryl group substituted with a fluorine atom for $Rf^1$ to $Rf^3$ is preferably 6 to 20, more preferably 6 to 12, further preferably 6 to 10, and particularly preferably 6 to 8.

The aryl group substituted with a fluorine atom is an aryl group substituted with at least one fluorine atom, preferably a perfluoroaryl group.

Examples of the aryl group substituted with a fluorine atom include perfluorophenyl, perfluorotolyl, and 2,6-dichloro-3,4,5-trifluorophenyl.

The alkyl group, the cycloalkyl group and the aryl group for $Rg^1$ to $Rg^4$ each have the same meanings as the alkyl group, the cycloalkyl group and the aryl group for Ra.

$Rg^1$ to $Rg^4$ are preferably an alkyl group or an aryl group, more preferably an alkyl group having 1 to 8 carbon atoms or an aryl group having 6 to 16 carbon atoms. The aryl group is preferably a phenyl group or a naphthyl group.

Herein, examples of the above-described organic boron anion include the following anions.

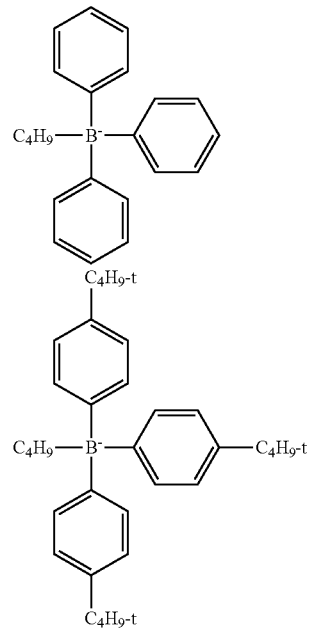

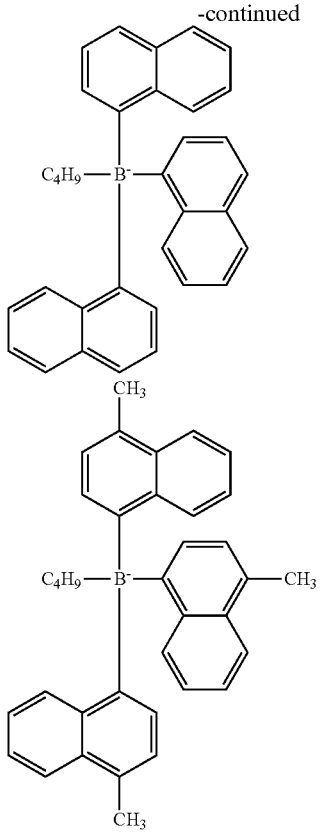

X⁻ is preferably a halogen ion, a carboxylic acid anion, a sulfonic acid anion, a phosphate anion, a phosphonic acid anion, a dicyanamide ion, or an anion represented by Formula (A4); more preferably a halogen ion, a carboxylic acid anion, a sulfonic acid anion, a phosphate anion, a phosphonic acid anion, a dicyanamide ion, or a bis(trifluoromethanesulfonyl)imide ion; particularly preferably a halogen ion, or a carboxylic acid anion; and most preferably a carboxylic acid anion.

Examples of the ionic compound include a quaternary phosphonium salt other than the compound represented by Formula (1) or (2), and the quaternary phosphonium salt is also preferable in the present invention.

Examples of the quaternary phosphonium of the quaternary phosphonium salt include tetramethyl phosphonium, tetraethyl phosphonium, tetrabutyl phosphonium, triethylmethyl phosphonium, methyltributyl phosphonium, and dimethyldiethyl phosphonium. As the anion, the above-described X⁻ is preferable.

The compound represented by Formula (1) or (2) is preferably a compound represented by any of Formulas (1a), (1 b) and (2a) to (2c).

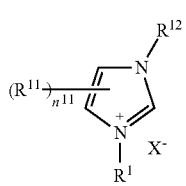
Formula (1a)

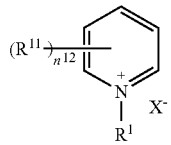
Formula (1b)

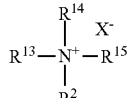
Formula (2a)

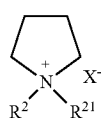
Formula (2b)

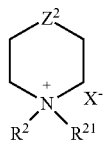
Formula (2c)

In Formulas (1a), (1b) and (2a) to (2c), $R^1$, $R^2$ and $X^-$ have the same meanings as $R^1$, $R^2$ and $X^-$ in Formula (1) or (2), respectively; and preferable ranges are also the same. $R^{11}$ and $R^{12}$ each independently designate a substituent. $n^{11}$ is an integer of 0 to 3, and $n^{12}$ is an integer of 0 to 5. Herein, when there are two or more $R^{11}$'s, the $R^{11}$'s may be the same or different from each other. In addition, at least two of $R^{11}$'s may be bonded to each other to form a ring.

$R^{13}$ to $R^{15}$ each independently designate an alkyl group, an alkenyl group, a cycloalkyl group, an aryl group, or a heterocyclic group. However, at least two of $R^2$ and $R^{13}$ to $R^{15}$ do not bond to each other to form any ring. $R^{21}$ has the same meaning as $R^2$, and a preferable range is also the same. $Z^2$ designates a single bond, a methylene group, —C(=O)—, —O—, —S—, —S(=O)—, —SO₂—, —N(Rα1)-, or —N⁺(Rα1)(Rα2)-. Rα1 designates a hydrogen atom or a substituent. Rα2 designates a substituent. Herein, Rα1 and Rα2 may be bonded to each other to form a ring.

The substituent for $R^{11}$ and $R^{12}$ each have the same meaning as Ra. $R^1$ has the same meaning as $R^1$ in Formula (1), and a preferable range is also the same. $R^2$ has the same meaning as $R^2$ in Formula (2), and a preferable range is also the same.

$R^{13}$ to $R^{15}$ has the same definitions as $R^3$ to $R^5$ in Formula (2), except that at least two of $R^{13}$ to $R^{15}$ do not bond to each other to form any ring, and a preferable range of $R^{13}$ to $R^{15}$ is also the same as $R^3$ to $R^5$.

Examples of the substituent for Rα1 include the substituents for Ra. Rα1 is preferably an alkyl group, an alkenyl group, a cycloalkyl group, an aryl group, a heterocyclic group, an acyl group, or a sulfonyl group; more preferably an alkyl group, an alkenyl group, a cycloalkyl group, an aryl group, or a heterocyclic group; and further preferably an alkyl group, an alkenyl group, a cycloalkyl group, or an aryl group.

The substituent for Rα2 has the same meaning as the substituent for Rα1, and a preferable range is also the same.

The ring formed by binding at least two $R^{11}$'s to each other is preferably a 5- or 6-membered ring; more preferably a benzene ring, or a heterocycle; further preferably a benzene ring, or a heteroaromatic ring; and particularly preferably a benzene ring.

The ring formed by binding Ra1 and Ra2 to each other is preferably a 5- or 6-membered ring; more preferably a nitrogen-containing saturated ring; and further preferably a pyrrolidine ring, a piperidine ring, a piperazine ring, a morpholine ring, or a thiomorpholine ring.

$R^{11}$ and $R^{12}$ each are preferably an alkyl group. $R^{13}$ to $R^{15}$, $R^2$ and $R^{21}$ each are preferably an alkyl group or an aryl group, more preferably an alkyl group.

Further, $R^1$ and $R^{12}$ are preferably an alkyl group having different carbon atoms from each other.

In the present invention, among the compounds represented by any of Formulas (1a), (1 b) and (2a) to (2c), the compound represented by Formula (1a), (1b) or (2a) is preferable, the compound represented by Formula (1a) or (2a) is more preferable, and the compound represented by Formula (1a) is further preferable.

Examples of the ionic compound used in the present invention include the following ionic liquid:
1-butyl-3-methylimidazolium acetate, 1-butyl-3-methylimidazolium chloride, 1-butyl-3-methylimidazolium bromide, 1-butyl-3-methylimidazolium dicyandiamide, 1-ethyl-3-methylimidazolium bis(trifluoromethylsulfonyl)imide, 1-butyl-3-methylimidazolium bis(trifluoromethylsulfonyl)imide, 1-hexyl-3-methylimidazolium bis(trifluoromethylsulfonyl)imide, 1-octyl-3-methylimidazolium bis(trifluoromethylsulfonyl)imide, 1-propyl-2,3-dimethylimidazolium bis(trifluoromethylsulfonyl)imide, 1-butyl-2,3-dimethylimidazolium bis(trifluoromethylsulfonyl)imide, N,N-diethyl-N-methyl-N-(2-methoxyethyl)ammonium bis(trifluoromethylsulfonyl)imide, 1-ethyl-3-methylimidazolium tris(trifluoromethylsulfonyl)methide, 1-butyl-3-methylimidazolium tris(trifluoromethylsulfonyl)methide, 1-hexyl-3-methylimidazolium tris(trifluoromethylsulfonyl)methide, 1-octyl-3-methylimidazolium tris(trifluoromethylsulfonyl)methide, 1-propyl-2,3-dimethylimidazolium tris(trifluoromethylsulfonyl)methide, 1-butyl-2,3-dimethylimidazolium tris(trifluoromethylsulfonyl)methide, N,N-diethyl-N-methyl-N-(2-methoxyethyl)ammonium tris(trifluoromethylsulfonyl)methide, 1-ethyl-3-methylimidazolium tris(pentafluoroethyl)trifluorophosphate, 1-butyl-3-methylimidazolium tris(pentafluoroethyl)trifluorophosphate, 1-hexyl-3-methylimidazolium tris(pentafluoroethyl)trifluorophosphate, 1-octyl-3-methylimidazolium tris(pentafluoroethyl)trifluorophosphate, 1-propyl-2,3-dimethylimidazolium tris(pentafluoroethyl)trifluorophosphate, 1-butyl-2,3-dimethylimidazolium tris(pentafluoroethyl)trifluorophosphate, N,N-diethyl-N-methyl-N-(2-methoxyethyl)ammonium tris(pentafluoroethyl)trifluorophosphate, 1-ethyl-3-methylimidazolium hexafluorophosphate, 1-butyl-3-methylimidazolium hexafluorophosphate, 1-hexyl-3-methylimidazolium hexafluorophosphate, 1-octyl-3-methylimidazolium hexafluorophosphate, 1-propyl-2,3-dimethylimidazolium hexafluorophosphate, 1-butyl-2,3-dimethylimidazolium hexafluorophosphate, N,N-diethyl-N-methyl-N-(2-methoxyethyl)ammonium hexafluorophosphate, 1-ethyl-3-methylimidazolium butyl triphenylborate, 1-butyl-3-methylimidazolium butyl tris(4-t-butylphenyl)borate, 1-hexyl-3-methylimidazolium butyl tris(1-naphthyl) borate, 1-octyl-3-methylimidazolium butyl tris(4-methylnaphthalene-1-yl) borate, 1-propyl-2,3-dimethylimidazolium butyl triphenylborate, 1-butyl-2,3-dimethylimidazolium hexyl tris(4-t-butylphenyl)borate, N,N-diethyl-N-methyl-N-(2-methoxyethyl)ammonium 2-ethylhexyl triphenylborate, 1-butylpyridinium hexafluorophosphate, 1-hexylpyridinium hexafluorophosphate, 1-ethyl-3-methylimidazolium tris(pentafluoroethyl)trifluorophosphate, 1-cyanomethyl-3-methylimidazolium bis(trifluoromethylsulfonyl)imide, N-hexyl-4-dimethylaminopyridinium bis(trifluoromethylsulfonyl)imide, 1-(2-hydroxyethyl)-3-methylimidazolium bis(trifluoromethylsulfonyl)imide, N-(3-hydroxypropyl) pyridinium bis(trifluoromethylsulfonyl)imide, N-ethyl-N,N-dimethyl-2-methoxyethylammonium tris(pentafluoroethyl) trifluorophosphate, 1-(2-hydroxyethyl)-3-methylimidazolium tris(pentafluoroethyl) trifluorophosphate, N-(3-hydroxypropyl)pyridinium tris (pentafluoroethyl)trifluorophosphate, N-(methoxyethyl)-N-methylmorpholium tris(pentafluoroethyl)trifluorophosphate, 1-(2-methoxyethyl)-1-methylpyrrolidinium tris(pentafluoroethyl)trifluorophosphate, 1-(methoxyethyl)-1-methylpiperidinium tris(pentafluoroethyl)trifluorophosphate, 1-(methoxyethyl)-1-methylpiperidinium bis(trifluoromethylsulfonyl)imide, N-(methoxyethyl)-1-methylpyrrolidinium bis(trifluoromethylsulfonyl)imide, and N-(methoxyethyl)-N-methylmorpholium bis(trifluoromethylsulfonyl)imide.

Meanwhile, as for the ionic compound including an ionic liquid, a commercial product can be also used.

Examples of such a compound include the following ionic liquid.

1) Water-Non-Miscible Ionic Liquid

Examples thereof include 1-ethyl-3-methylimidazolium bis(trifluoromethylsulfonyl)imide, 1-propyl-2,3-dimethylimidazolium bis(trifluoromethylsulfonyl)imide, 1-butyl-3-methylimidazolium bis(trifluoromethylsulfonyl)imide, and 1-propyl-2,3-dimethylimidazolium tris(trifluoromethylsulfonyl)methide [commercially available from Covalent Associates Inc]; and N,N-diethyl-N-methyl-N-(2-methoxyethyl)ammonium bis(trifluoromethylsulfonyl)imide, 1-hexyl-3-methylimidazolium bis(trifluoromethylsulfonyl) imide, 1-octyl-3-methylimidazolium bis(trifluoromethylsulfonyl)imide, 1-ethyl-2,3-dimethylimidazolium bis(trifluoromethylsulfonyl)imide, and 1-butyl-2,3-dimethylimidazolium bis(trifluoromethylsulfonyl)imide [commercially available from KANTO CHEMICAL CO., INC.].

2) Water-Miscible Ionic Liquid

Examples thereof include N,N-diethyl-N-methyl-N-(2-methoxyethyl)ammonium tetrafluoroborate, and 1-ethyl-3-methylimidazolium acetate [commercially available from Kanto Chemical Co., Inc.]; 1-methyl-3-propylimidazolium iodide [commercially available from Tokyo Chemical Industry Co., Ltd.], and 1-ethyl-3-methylimidazolium trifluoroacetate [commercially available from Merck Ltd, Japan].

The ionic compound may be used on one type or in combination of two or more types.

In the present invention, the content of the ionic compound is preferably 0.001 times or more and less than 1.000 time, more preferably 0.01 times or more and less than 1.000 time, more preferably 0.01 times or more and less than 1.000 time, particularly preferably from 0.01 times to 0.8 times, and particularly preferably from 0.05 times to 0.7 times, in mass ratio with respect to the cellulose.

The ionic compound is a salt composed of an anion constituent and a cation constituent. In a case where the ionic substance is in the state of a liquid, there is also an ionic compound which has such a solution character as to completely dissolve the cellulose due to a high miscibility to a cellulose molecule.

There is a proposed explanation about the interaction between the ionic compound and the cellulose molecule as reported, for example, by Green Chem., 2015, 17, 694-714 that dissolution of the cellulose molecule into the ionic compound is caused by the mechanism that the ionic compound acts on a hydroxyl group (hydroxy group) which the cellulose molecule has, thereby to cut a hydrogen bond formed between hydroxyl groups of the cellulose molecule, which permits the ionic compound to get through cellulose molecules.

Therefore, in a case where the content of the ionic compound is 1.000 time or more with respect to the cellulose, a crystal in the cellulose dissolves and resultantly reduction in elastic modulus is caused.

In reverse, in a case where the content of the ionic compound is less than 0.001 times with respect to the cellulose, the reduction in elastic modulus is not caused, because almost all of firm hydrogen bonds between the cellulose molecules remain. However, miniaturization of the cellulose cannot be achieved only by a shear stress in a processing machine.

In view of the above, it is important to make a balance between miniaturization of the cellulose in the processing machine and improvement in a mechanical property which is obtained by a firm hydrogen bond having been formed between the cellulose molecules in the miniaturized cellulose.

<Other Addition Component>

Into the thermoplastic resin composition of the present invention, in addition to the above-described materials, other addition components can be appropriately incorporated in the range in which the above-described purpose is not adversely affected, such as an antioxidant, a light stabilizer, a radical scavenger, an ultraviolet absorber, a colorant (dye, organic pigment, inorganic pigment), a filler, a slipping agent, a plasticizer, a processing aid such as an acrylic processing aid, a foaming agent, a lubricant such as paraffin wax, a surface treatment agent, a nucleating agent, a releasing agent, a hydrolysis inhibitor, an anti-blocking agent, an antistatic agent, an anticlouding agent, a fungicidal agent, an ion trapping agent, a flame retardant and a flame retardant aid.

Specific examples of the antioxidant and a deterioration inhibitor include a phenol-based antioxidant, a phosphorus-based antioxidant, a sulfur-based antioxidant, a hydroxylamine-based antioxidant and an amine-based antioxidant. As the phenol-based antioxidant, a hindered phenol-based compound having a t-alkyl group in an ortho position is preferable.

Specific examples of the phenol-based antioxidant include tetrakis[methylene-3-(3',5'-di-t-butyl-4-hydroxyphenyl)propionate]methane, octadecyl-3-(3,5-di-t-butyl-4-hydroxyphenyl)propionate, 3,9-bis[2-{3-(3-t-butyl-4-hydroxy-5-methylphenyl)propionyloxy}-1,1-dimethylethyl]-2,4,8,10-tetraoxaspiro[5•5]undecane, triethyleneglycol-N-bis-3-(3-t-butyl-5-methyl-4-hydroxyphenyl)propionate, 1,6-hexandiol bis[3-(3,5-di-t-butyl-4-hydroxyphenyl)propionate]; and 2,2-thiobis-diethylene bis[3-(3,5-di-t-butyl-4-hydroxyphenyl)propionate], and further preferably include 3,9-bis[2-{3-(3-t-butyl-4-hydroxy-5-methylphenyl)propionyloxy}-1,1-dimethylethyl]-2,4,8,10-tetraoxaspiro[5•5]undecane, lauryl-3,5-t-butyl-4-hydroxy benzoate, palmityl-3,5-t-butyl-4-hydroxybenzoate, stearyl-3,5-t-butyl-4-hydroxy benzoate, behenyl-3,5-t-butyl-4-hydroxy benzoate, 2,4-di-t-butyl-phenyl-3,5-di-t-butyl-4-hydroxy benzoate and tocopherols.

Specific examples of the phosphorous-based antioxidant include tris(nonylphenyl)phosphite, tris(2,4-di-t-butylphenyl)phosphite, distearylpentaerythritol diphosphite, bis(2,4-di-t-butylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, bis(2,4-dicumylphenyl)pentaerythritol diphosphite, tetrakis(2,4-di-t-butylphenyl)-4,4'-diphenylene diphosphonite, 2,2'-methylene bis(4,6-di-t-butylphenyl)-2-ethylhexyl phosphite, 2,2'-ethylidene bis(4,6-di-t-butylphenyl)fluoro phosphite, bis(2,4-di-t-butyl-6-methylphenyl)ethyl phosphite, 2-(2,4,6-tri-t-butylphenyl)-5-ethyl-5-butyl-1,3,2-oxaphosphorinane, 2,2',2'-nitrilo[triethyl-tris(3,3',5,5'-tetra-t-butyl-1,1'-biphenyl-2,2'-diyl)phosphite, and 2,4,8,10-tetra-t-butyl-6-[3-(3-methyl-4-hydroxy-5-t-butylphenyl)propoxy]dibenzo[d,f][1,3,2]dioxaphosphepine.

Specific examples of the sulfur-based antioxidant include dilauryl 3,3'-thiodipropionate, tridecyl 3,3'-thiodipropionate, dimyristyl 3,3'-thiodipropionate, distearyl 3,3'-thiodipropionate, laurylstearyl 3,3'-thiodipropionate, neopentanetetrayl tetrakis(3-laurylthiopropionate) and bis[2-methyl-4-(3-n-alkyl(an alkyl having 12 to 14 carbon atoms)thiopropionyloxy)-5-t-butylphenyl] sulfide.

Specific examples of the light stabilizer include a hindered amine light stabilizer having a molecular weight of 1000 or more (a light stabilizer having a 2,2,6,6-tetramethylpiperidine skeleton in the molecule).

Specific examples of the ultraviolet absorber include a benzotriazol-based compound, a triazine-based compound, a benzophenone-based compound, a salicylate-based compound, a cyanoacrylate-based compound and a nickel-based compound.

Specific examples of the colorant include carbon black, an inorganic pigment and an organic pigment. Specific examples of the carbon black include furnace black, channel black, acetylene black and lamp black. Specific examples of the inorganic pigment include black iron oxide, red iron oxide, titanium oxide, cadmium red, cadmium yellow, ultramarine blue, cobalt blue, titan yellow, red lead, yellow lead and iron blue. Specific examples of the organic pigment include quinacridone, polyazo yellow, anthraquinone yellow, polyazo red, azolake yellow, perylene, phthalocyanine green, phthalocyanine blue and isoindolinone yellow. These colorants may be used singly or two or more kinds thereof may be used in combination.

As the filler, silica, hydroxyapatite, alumina, titania, boehmite, talc, a metal compound such as calcium carbonate, and the like are preferably exemplified.

<<Method of Producing Thermoplastic Resin Composition>>

In the present invention, in the thermoplastic synthetic resin together with the cellulose, miniaturization of the cellulose can be carried out.

In the production of the thermoplastic resin composition, the thermoplastic synthetic resin, and the cellulose or the cellulose and the ionic compound are each respectively blended so that the content of the cellulose is from 1 to 100 parts by mass with respect to 100 parts by mass of the thermoplastic synthetic resin, and in the case where the cellulose and the ionic compound are blended, the content of the ionic compound is permitted to set to 0.001 times or more and less than 1.000 time of the cellulose.

In the present invention, in order to perform miniaturization of the cellulose, it is preferable in particular that a mixture of the cellulose and the ionic compound, namely a cellulose composition, is prepared and then the prepared cellulose composition and the thermoplastic synthetic resin are blended.

Therefore, in the case of blending the cellulose and the ionic compound, a step of preparing the cellulose composition in which the content of the ion compound is 0.1% by mass or more and less than 50% by mass is performed.

In the present invention, a blended amount of the cellulose composition is adjusted so that the content of the cellulose is from 1 to 100 parts by mass with respect to 100 parts by mass of the thermoplastic synthetic resin.

Herein, the ionic compound, for example, in a case of the halogen anion (chlorine anion in particular), sometimes translates into a liquid form due to moisture absorption depending on the condition of storage. In this case, it is preferred to use a material in a solid-form at room temperature, from which water has been evaporated by drying in a vacuum.

In the cellulose, an intermolecular association force is firm by a hydrogen bond due to hydroxyl groups in the molecule.

It is considered that a plant fiber is miniaturized by containing therein a resin containing a resin having a group containing a partial structure of an acid anhydride in the polymer molecule as one type of the thermoplastic resins, and further miniaturization is more facilitated by making an ionic substance coexist in this system, and further the ionic compound cut off a hydrogen bond between cellulose molecules. Furthermore, it is considered that an anion constituent in the constituent elements of the ionic compound directly acts on a hydrogen atom of the hydroxyl group which the cellulose molecule has. Therefore, it is presumed that a structure of the anion constituent has a profound effect on ability to dissolve the cellulose.

In the cellulose itself, as described above, since the intermolecular association force is firm, miniaturization cannot be moved forward only with a shear stress in a processing machine. However, when there is a resin having a group containing a partial structure of an acid anhydride in the polymer molecule, adhesion at the interface between the cellulose and the resin is improved. Because a shearing stress in the resin caused in the processing machine is well transmitted also to the cellulose by this improvement of adhesion, miniaturization becomes easy to occur. Further, a combination use of the ionic compound in here allows further facilitation of the miniaturization due to partial attenuation of the intermolecular bonding force of the cellulose.

In the present invention, after blending the thermoplastic synthetic resin and the cellulose composition, a step of subjecting the blend composition to kneading processing is performed thereby to miniaturize the cellulose in this step.

In particular, in the present invention, after blending the resin having a group containing a partial structure of an acid anhydride in the polymer molecule and the cellulose composition, it is preferable to perform a step of subjecting the blend composition to kneading processing. In addition, after the step of subjecting the blend composition to kneading processing, the resultant mixture is preferably blended with a base resin (a thermoplastic resin other than the resin having a group containing a partial structure of an acid anhydride in the polymer molecule).

In this step of the kneading processing, the kneading is preferably performed in the processing machine at the step of processing and molding by extrusion, injection, or the like.

The kneading temperature is not particularly limited, as long as the resin can be kneaded. It is desirable that, in a case where the resin does not contain any ionic compound, the lower limit of the kneading temperature is set to a melting point of the resin (softening point in a case of a non-crystalline resin), whereas in a case of containing an ionic compound, the lower limit of the kneading temperature is set to a melting point of the ionic compound in addition to the above-described conditions, and the upper limit is set to a temperature at which a thermal decomposition is lessen. Accordingly, although a temperature of the lower limit changes depending on the kind of the ionic compound, a temperature of the upper limit is preferably 300° C. or less, more preferably 250° C. or less, and further preferably 230° C. or less.

As to the agitation in the kneading, the kneading is preferably performed by assembling a screw constitution capable of ensuring an enough kneading property, for example, by appropriately arranging kneading discs in the screw shaft direction, and by a screw rotation speed (ordinarily, nearly the range of 100 to 300 rpm) which enables to obtain a required amount of production.

As to the apparatus for the kneading processing, an apparatus of two-shaft screw system rotating in the same direction is preferable. Examples thereof include a twin screw extruder [KZW15TW-45MG-NH manufactured by Technovel Corporation].

However, the apparatus for the kneading processing is not limited to the apparatus of two-shaft screw system rotating in the same direction, but apparatus of any system may be accepted, as long as an enough kneading property is obtained, whereby the effects of the present invention are obtained equally, such as a single-shaft extruder, an anisotropic two-shaft extruder, a three-shaft or more multi-shaft extruder, a batch-type kneader (kneader, Bunbury mixer, or the like) and the like.

<<Molded Article of Cellulose-Reinforced Resin and Method of Producing the Same>>

The cellulose-reinforced resin or a molded article of the cellulose-reinforced resin according to the present invention contains a thermoplastic synthetic resin and a cellulose and further may contain an ionic compound.

The content of the ionic compound is 0.001 times or more and less than 1.000 time of the cellulose.

In the cellulose-reinforced resin or a molded article of the cellulose-reinforced resin according to the present invention, since the cellulose and the resin having a group containing a partial structure of an acid anhydride in the polymer molecule are contained in the thermoplastic resin composition, a hydroxyl group of the cellulose and the group containing a partial structure of an acid anhydride in the polymer molecule sometimes bring about reactions. Therefore, when they brought about reactions, the acid anhydride moiety of the resin having a group containing a partial structure of an acid anhydride in the polymer molecule acts as an acylating agent, whereby the cellulose is modified to a cellulose acylated with this acylating agent, which results in formation of a composite body with the resin having a group containing a partial structure of an acid anhydride in the polymer molecule.

In contrast, when they did not bring about reactions, the group containing a partial structure of an acid anhydride in the polymer molecule remains the same.

Therefore, in the cellulose-reinforced resin or a molded article of the cellulose-reinforced resin according to the present invention, a resin having at least one type of groups selected from a group containing a partial structure of an acid anhydride (namely a group which did not react with the cellulose) and a group containing an acylated cellulose structure (in the case where even a part of cellulose brought about reactions), in the polymer molecule is resultantly contained in addition to an ionic compound.

The cellulose-reinforced resin or the molded article of the cellulose-reinforced resin of the present invention is molded by employing the thermoplastic resin composition of the present invention, particularly the thermoplastic resin composition produced by the method of producing the above-described thermoplastic resin composition according to the present invention.

Specific examples of an application of the molded article to be formed by the thermoplastic resin composition or the cellulose-reinforced resin of the present invention include a material for a vehicle such as an automobile and a two-wheeled vehicle, a structural member of a robot arm, a robot part for amusement, a prosthesis member, a material for electrical appliances, an OA device housing, a building material member, drainage facilities, a toiletry material, various tanks, a container, a sheet, a toy and sport goods.

Specific examples of the material for the vehicle include an interior part such as a door trim, a pillar, an instrumental panel, a console, a rocker panel, an armrest, an inner panel of door, a spare tire cover and a door knob, an exterior part such as a bumper, a spoiler, a fender, a side step and an outer panel of door, other parts such as an air intake duct, a coolant reserve tank, a radiator reserve tank, a window-washer tank, a fender liner and a fan, and an integrally molded part such as a front-end panel.

EXAMPLES

Hereinafter, the present invention will be described more in detail with reference to Examples, but the present invention is not limited thereto.

Hereinafter, the used materials are shown.
<Used Materials>
(1) Thermoplastic Synthetic Resin
  Base resin: High density polyethylene [MFR (190° C./2.16 kg)=25 g/10 minutes, density=0.94 g/cm$^3$]
(2) Acid-Modified Thermoplastic Synthetic Resin
  FUSABOND M603 [trade name, manufactured by DuPont, maleic acid-modified ethylene-propylene random copolymer, MFR (190° C./2.16 kg)=1.4 g/10 minutes, density=0.862 g/cm$^3$]
(3) Cellulose
  KC FLOC W-200 [trade name, manufactured by Nippon Paper Industries Co., Ltd., powdered cellulose having average particle diameter of about 32 μm]
(4) Ionic Compound
  Ionic compound: 1-butyl-3-methylimidazolium acetate (melting point: −20° C. or less)

Example 1

The cellulose-reinforced thermoplastic resin was produced by the following steps.
1) Preparing Step of Cellulose Composition In an acetone solvent, 90 parts by mass of the powdered cellulose was dispersed and was mixed with 10 parts by mass of the ionic compound, 1-butyl-3-methylimidazolium acetate, and then the mixture was left to stand in a covered container for 12 hours or more while stirring the mixture at a few hour intervals.

After that, the lid of the container was opened to evaporate the acetone solvent. After evaporation of most of the acetone solvent, the container was further stored for 12 hours or more in a thermostat at 80° C. in order to dehydrate.
2) Kneading Step of Cellulose Composition and Thermoplastic Synthetic Resin (Production of Cellulose-Reinforced Thermoplastic Resin Composition)

A cellulose-reinforced thermoplastic resin composition was produced by feeding the acid-modified thermoplastic synthetic resin, FUSABOND M603 [trade name, manufactured by DuPont], in a twin screw extruder [KZW15TW-45MG-NH, manufactured by Technovel Corporation] at outlet temperature of 150° C. and a speed of 300 g/hr., and at the same time, by feeding the above-prepared cellulose composition using a second feeder at a speed of 300 g/hr., thereby to extrude them. At this time, the screw rotation speed was set to 100 rpm.

At this extrusion step, the acid-modified thermoplastic synthetic resin and the powdered cellulose were kneaded to disperse the powdered cellulose, whereby the cellulose fiber was miniaturized. Further, it is considered that this miniaturization further moved ahead also at the following 3) Preparation step. Meanwhile, even if miniaturization was not enough at the forgoing 2) Kneading step, miniaturization can be achieved by performing the following 3) Preparation step.
3) Preparation Step of Cellulose-Reinforced Thermoplastic Resin Composition Containing Base Resin of Thermoplastic Synthetic Resin The cellulose-reinforced thermoplastic resin composition in which the cellulose fiber miniaturized by the above-described extrusion had been dispersed in the acid-modified thermoplastic synthetic resin, and the base resin of the thermoplastic synthetic resin were subjected to a dry-blending so that the base resin: acid-modified thermoplastic synthetic resin was 80:20 in terms of ratio by mass. Then, a cellulose-reinforced thermoplastic resin composition was prepared by a twin screw extruder [KZW15TW-45MG-NH, manufactured by Technovel Corporation] to produce the same. At this time, the outlet temperature of the twin screw extruder was set to 190° C. and the cellulose-reinforced thermoplastic resin composition was prepared by feeding at a speed of 1,000 g/hr. At this time, the screw rotation speed was set to 100 rpm.

It is considered that miniaturization of the cellulose fiber further moved ahead also at this preparation process.

Example 2

A cellulose-reinforced thermoplastic resin composition was produced in the same manner as in Example 1, except for changing the breakdown of the base resin, the acid-modified thermoplastic synthetic resin, and the cellulose composition in Example 1 so as to be the blended amount shown in Table 1.

Example 3

A cellulose-reinforced thermoplastic resin composition was produced in the same manner as in Example 1, except for changing the breakdown of the base resin, the acid-modified thermoplastic synthetic resin, and the cellulose composition in Example 1 so as to be the blended amount shown in Table 1.

Example 4

A cellulose-reinforced thermoplastic resin composition was produced in the same manner as in Example 1, except for changing the breakdown of the base resin, the acid-modified thermoplastic synthetic resin, and the cellulose composition in Example 1 so as to be the blended amount shown in Table 1.

Example 5

A cellulose-reinforced thermoplastic resin composition was produced in the same manner as in Example 1, except for changing the breakdown of the base resin, the acid-modified thermoplastic synthetic resin, and the cellulose composition in Example 1 so as to be the blended amount shown in Table 1.

Example 6

A cellulose-reinforced thermoplastic resin composition was produced in the same manner as in Example 1, except for changing the breakdown of the base resin, the acid-modified thermoplastic synthetic resin, and the cellulose composition in Example 1 so as to be the blended amount shown in Table 1.

Example 7

A cellulose-reinforced thermoplastic resin composition was prepared and produced without performing the step 1) of Example 1, and by employing the powdered cellulose itself in place of the cellulose composition, and blending 11.1 parts by mass of the powdered cellulose with respect to 100 parts by mass of the thermoplastic resin, and then extruding the resultant blend composition using a twin screw extruder [KZW15TW-45MG-NH, manufactured by Technovel Corporation] in the step 2) of Example 1.

Comparative Example 1

In the step 1) of Example 1, 70 parts by mass of the ionic liquid A was blended with respect to 30 parts by mass of the powdered cellulose. In the present case, this step affected the handling property in a manner such that the powdered cellulose dissolved and the dissolved powdered cellulose partially recrystallized in the acetone solvent, and the cellulose-dissolved material converted to a thickened liquid form after drying clung to materials. Therefore, in the step 2), a twin-screw extruder was not employed, but LABO PLASTOMILL (kneading-extrusion molding evaluation test apparatus, LABO PLASTOMILL p, manufactured by Toyo Seiki Seisaku-sho Co., Ltd.) was used. The obtained composition was pelletized, whereby a thermoplastic resin composition was prepared and produced.

Further, in the step 3), a cellulose-reinforced thermoplastic resin composition was prepared in the same manner as in the step 3) of Example 1, except for subjecting the base resin to a dry-blending so that the base resin: the acid-modified thermoplastic synthetic resin was 80:20 in terms of ratio by mass.

In each prepared and produced cellulose-reinforced thermoplastic resin composition, the apparent elastic modulus of cellulose contained in the each cellulose-reinforced thermoplastic resin composition was measured as follows.

(Measurement of Apparent Elastic Modulus of Cellulose in Thermoplastic Resin Composition)

Injection molding was performed using each of the above-produced cellulose-reinforced thermoplastic resin compositions to prepare a bending test specimen (4 mm in thickness × 80 mm in length). Meanwhile, the injection molding was performed under the molding conditions that are considered to be proper in general.

The bending elastic modulus was calculated according to JIS K 7171. The density was compliant with JIS K 7112. However, as a measurement solvent, ethanol was used instead of water.

From the obtained density, the volume fraction of each constituent of the synthetic resin and cellulose was calculated. Meanwhile, the density and the elastic modulus of just the synthetic resin were calculated separately according to JIS K 7112 and JIS K 7171. The apparent elastic modulus of cellulose Ef was calculated from Equation (2.2) modified from Equation (2.1).

Meanwhile, Em was calculated from Equation (4.1) based on the Law of mixture on the condition of Equation (4.2).

The obtained elastic modulus was defined as $Ef_1$.

$$Ec = EmVm + EfVf \quad (2.1)$$

$$Ef = \{Ec - Em(1 - Vf)\}/Vf \quad (2.2)$$

$$Em = \sum_{p=1}^{n} EpVp \quad (4.1)$$

$$\sum_{p=1}^{n} Vp = 1 \quad (4.2)$$

On the other hand, also for a thermoplastic resin compositions prepared in the same manner as in Examples 1 to 7 and Comparative Example 1, except for not adding the acid-modified thermoplastic synthetic resin or the ionic liquid of the ionic compound in Examples 1 to 7 and Comparative Example 1, the apparent elastic modulus Ef of the cellulose was calculated.

The elastic modulus in this case was defined as $Ef_0$.

Based on each of the elastic modulus, $Ef_1$ and $Ef_0$ obtained by the above, the magnification ratio ($Ef_1/Ef_0$) of $Ef_1$ to $Ef_0$ was calculated.

Herein, as the above-described magnification ratio, 1.1 times or more is an acceptable level.

The obtained results are shown collectively in the following Table 1.

Herein, the number in Table with respect to the thermoplastic synthetic resin, the cellulose composition, and their breakdown is of part by mass.

TABLE 1

| Composition | | Ex 1 | Ex 2 | Ex 3 | Ex 4 | Ex 5 | Ex 6 | Ex 7 | CEx 1 |
|---|---|---|---|---|---|---|---|---|---|
| Thermoplastic synthetic resin | | 100 | 100 | 100 | 100 | 100 | 100 | 100 | 100 |
| Breakdown | Base resin | 80 | 80 | 80 | 99 | 98 | 50 | 80 | 80 |
| | Acid-modified thermoplastic synthetic resin | 20 | 20 | 20 | 1 | 2 | 50 | 20 | 20 |
| Cellulose composition | | 10 | 100 | 100 | 11 | 1 | 50 | 11.1 | 25 |
| Breakdown | Cellulose | 90 | 99.9 | 51 | 90 | 90 | 90 | 100 | 30 |
| | Ionic compound | 10 | 0.1 | 49 | 10 | 10 | 10 | 0 | 70 |

TABLE 1-continued

| Composition | Ex 1 | Ex 2 | Ex 3 | Ex 4 | Ex 5 | Ex 6 | Ex 7 | CEx 1 |
|---|---|---|---|---|---|---|---|---|
| Magnification ratio of elastic modulus [After miniaturization of cellulose/before miniaturization of cellulose] | 1.69 | 1.21 | 1.23 | 1.53 | 1.42 | 1.48 | 1.12 | 0.88 |

Remarks:
'Ex' means Example according to this invention, and 'CEx' means Comparative Example.

From the above Table 1, in the thermoplastic resin compositions of the present invention in Examples 1 to 7, the magnification ratio of each of the apparent elastic moduli of the cellulose was 1.1 times or more.

In the thermoplastic resin compositions of the present invention, because the apparent elastic modulus of the cellulose was significantly increased, miniaturization of the cellulose was greatly facilitated.

It is considered that because an interface property between the thermoplastic synthetic resin and the cellulose fiber was improved by a maleic acid-modified ethylene-propylene random copolymer of the acid-modified thermoplastic synthetic resin, this increase was brought about by the improvement in transmission of power from the cellulose fiber to the thermoplastic synthetic resin. The use of the ionic liquid of the ionic compound further moves miniaturization of the cellulose forward and resultantly reinforcement effect of the strength due to the cellulose was obtained.

In contrast, in the thermoplastic resin composition of Comparative Example 1, the magnification ratio of the apparent elastic modulus of the cellulose went down as low as 0.88 times in reverse.

This is thought to have been caused by the following matters: even after kneading the cellulose in the thermoplastic synthetic resin, the reinforcement effect was not exerted, because the ionic compound was contained in an excessive blended amount with respect to the cellulose, which resulted in dissolution of the cellulose and loss of crystals.

It is found that the thermoplastic resin compositions of Examples 1 to 7 according to the present invention are useful for a variety of molded articles formed of a cellulose-reinforced resin, because the elastic modulus is improved, whereby reinforcement efficiency of the thermoplastic resin is increased.

Having described our invention as related to this embodiment, it is our intention that the invention not be limited by any of the details of the description, unless otherwise specified, but rather be construed broadly within its spirit and scope as set out in the accompanying claims.

The invention claimed is:

1. A thermoplastic resin composition, comprising:
a thermoplastic synthetic resin,
a cellulose, and
an ionic compound;
wherein at least one type of the thermoplastic synthetic resin is a resin having a group containing a partial structure of an acid anhydride in the polymer molecule, wherein the ionic compound is represented by Formula (1) or (2):

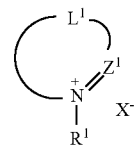

Formula (1)

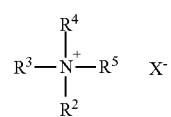

Formula (2)

wherein, in Formulas (1) and (2), $Z^1$ designates =C(Ra)— or =N—; Ra designates a hydrogen atom or a substituent; $L^1$ designates a divalent linking group; $R^1$ to $R^5$ each independently designate an alkyl group, an alkenyl group, a cycloalkyl group, an aryl group or a heterocyclic group; at least two of $R^2$ to $R^5$ may be bonded to each other to form a ring; and $X^-$ designates an anion, wherein a content of the ionic compound is 0.001 times or more and less than 1.000 time of the mass content of the cellulose, wherein a content of the cellulose is from 1 to 100 parts by mass, with respect to 100 parts by mass of the thermoplastic synthetic resin, wherein a content of the resin having a group containing a partial structure of an acid anhydride in the polymer molecule is from 1 to 50% by mass in the thermoplastic synthetic resin, and wherein the cellulose is in a bundle form of un-fibrillated cellulose, and plant fiber-derived cellulose.

2. The thermoplastic resin composition according to claim 1, wherein the compound represented by Formula (1) or (2) is represented by any one of Formulas (1a), (1b) and (2a) to (2c):

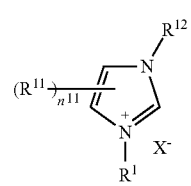

Formula (1a)

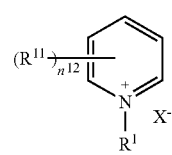

Formula (1b)

-continued

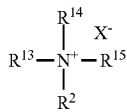

Formula (2a)

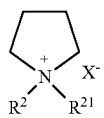

Formula (2b)

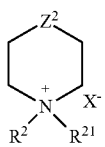

Formula (2c)

wherein, in Formulas (1a), (1b) and (2a) to (2c), $R^1$, $R^2$ and $X^-$ have the same meanings as $R^1$, $R^2$ and $X^-$ in Formula (1) or (2), respectively; and $R^{11}$ and $R^{12}$ each independently designate a substituent; $n^{11}$ is an integer of 0 to 3; $n^{12}$ is an integer of 0 to 5; when there exists two or more $R^{11}$'s, the $R^{11}$'s may be the same or different from each other; at least two of $R^{11}$'s may be bonded to each other to form a ring; $R^{13}$ to $R^{15}$ each independently designate an alkyl group, an alkenyl group, a cycloalkyl group, an aryl group, or a heterocyclic group; at least two of $R^2$ and $R^{13}$ to $R^{15}$ do not bonded to each other to form any ring; $R^{21}$ has the same meaning as $R^2$; $Z^2$ designates a single bond, a methylene group, —C(=O)—, —O—, —S—, —S(=O)—, —SO$_2$—, —N(R$\alpha$1)-, or —N$^+$(R$\alpha$1)(R$\alpha$2)-; R$\alpha$1 designates a hydrogen atom or a substituent; R$\alpha$2 designates a substituent; and R$\alpha$1 and R$\alpha$2 may be bonded to each other to form a ring.

3. The thermoplastic resin composition according to claim 1, wherein the $X^-$ is a halogen ion, a carboxylic acid anion, a sulfonic acid anion, a phosphate anion, a phosphonic acid anion, a dicyanamide ion, or a bis(trifluoromethanesulfonyl) imide ion.

4. The thermoplastic resin composition according to claim 1, wherein an apparent elastic modulus ($Ef_1$) of the cellulose contained in the thermoplastic resin composition at the time when a uniform dispersion element is formed by applying a shear force to the thermoplastic resin composition, is 1.1 times or more with respect to an apparent elastic modulus ($Ef_0$) of the cellulose contained in the thermoplastic resin composition at the time when a uniform dispersion element is formed by applying a shear force to the thermoplastic resin composition that does not contain the ionic compound or the resin having a group containing a partial structure of an acid anhydride in the polymer molecule.

5. A cellulose-reinforced resin, which is obtained by subjecting the thermoplastic resin composition according to claim 1 to a kneading processing,
wherein at least one type of the thermoplastic synthetic resin is a resin having at least one group selected from a group containing a partial structure of an acid anhydride and a group containing an acylated cellulose structure, in the polymer molecule.

6. The cellulose-reinforced resin according to claim 5, wherein the ionic compound is represented by Formula (1).

7. A molded article of a cellulose-reinforced resin, which is obtained by molding the cellulose-reinforced resin composition according to claim 5.

8. The molded article of a cellulose-reinforced resin according to claim 7, wherein an application of the molded article is a material for a vehicle.

9. The molded article of a cellulose-reinforced resin according to claim 7, wherein the molded article is a door trim, a pillar, an instrumental panel, a console, a rocker panel, an armrest, an inner panel of door, a spare tire cover, a door knob, a bumper, a spoiler, a fender, a side step, an outer panel of door, an air intake duct, a coolant reserve tank, a radiator reserve tank, a window-washer tank, a fender liner, a fan, or a front-end panel.

10. A method of producing a cellulose-reinforced resin, which comprises a step of subjecting the thermoplastic resin composition according to claim 1 to a kneading processing.

11. The method of producing a cellulose-reinforced resin according to claim 10, which comprises a step of blending a mixture of a thermoplastic synthetic resin, the cellulose, and the ionic compound,
wherein a content of the ionic compound in the mixture is 0.1% by mass or more and less than 50% by mass, and
wherein the cellulose is in a bundle form of un-fibrillated cellulose, and plant fiber-derived cellulose.

12. A method of producing a molded article of a cellulose-reinforced resin, which comprises molding the cellulose-reinforced resin composition produced by the method of producing a cellulose-reinforced resin composition according to claim 10.

13. A method of producing a cellulose-reinforced resin, which comprises a step of, after kneading a mixture of a thermoplastic synthetic resin having a group containing a partial structure of an acid anhydride in the polymer molecule, a cellulose and an ionic compound, blending the resultant kneaded composition with a thermoplastic synthetic resin other than the thermoplastic synthetic resin having a group containing a partial structure of an acid anhydride in the polymer molecule,
wherein the cellulose is in a bundle form of un-fibrillated cellulose, and plant fiber-derived cellulose,
wherein the ionic compound is represented by Formula (1) or (2):

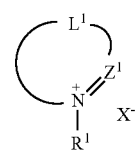

Formula (1)

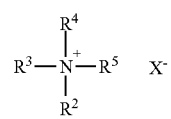

Formula (2)

wherein, in Formulas (1) and (2), $Z^1$ designates =C(Ra)— or =N—; Ra designates a hydrogen atom or a substituent L1 designates a divalent linking group; $R^1$ to $R^5$ each independently designate an alkyl group, an alkenyl group, a cycloalkyl group, an aryl group or a heterocyclic group; at least two of $R^2$ to $R^5$ may be bonded to each other to form a ring; and $X^-$ designates an anion,
wherein a content of the ionic compound is 0.001 times or more and less than 1.000 time of the mass content of the cellulose, wherein a content of the cellulose is from 1 to 100 parts by mass, with respect to 100 parts by mass of total of the thermoplastic synthetic resin having a group containing a partial structure of an acid anhydride in the polymer molecule and the thermoplastic synthetic resin other than the thermoplastic synthetic resin having a group containing a partial structure of an acid anhydride in the polymer molecule, and wherein a content of the thermoplastic synthetic resin having a group containing a partial structure of an acid anhydride in the polymer molecule is from 1 to 50% by mass in the total content of the thermoplastic synthetic resin having a group containing a partial structure of an acid anhydride in the polymer molecule and the thermoplastic synthetic resin other than the thermoplastic synthetic resin having a group containing a partial structure of an acid anhydride in the polymer molecule thermoplastic synthetic resin.

\* \* \* \* \*